(12) United States Patent
Chen et al.

(10) Patent No.: US 11,631,262 B2
(45) Date of Patent: Apr. 18, 2023

(54) SEMANTIC SEGMENTATION FOR STROKE CLASSIFICATION IN INKING APPLICATION

(71) Applicant: Microsoft Technology Licensing, LLC, Redmond, WA (US)

(72) Inventors: Tianyi Chen, Redmond, WA (US); Gowtham Ganesan, Redmond, WA (US); Biyi Fang, Redmond, WA (US); Sheng Yi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 166 days.

(21) Appl. No.: 17/098,285

(22) Filed: Nov. 13, 2020

(65) Prior Publication Data

US 2022/0156486 A1 May 19, 2022

(51) Int. Cl.
| | | |
|---|---|---|
| *G06V 30/32* | (2022.01) | |
| *G06T 7/10* | (2017.01) | |
| *G06V 10/44* | (2022.01) | |
| *G06V 30/262* | (2022.01) | |
| *G06F 18/21* | (2023.01) | |
| *G06N 3/04* | (2023.01) | |
| *G06N 3/08* | (2023.01) | |

(52) U.S. Cl.
CPC ............ *G06V 30/347* (2022.01); *G06F 18/21* (2023.01); *G06N 3/04* (2013.01); *G06N 3/08* (2013.01); *G06T 7/10* (2017.01); *G06V 10/44* (2022.01); *G06V 30/274* (2022.01)

(58) Field of Classification Search
CPC .... G06V 30/347; G06V 10/44; G06V 30/274; G06V 10/82; G06V 30/19173; G06K 9/6217; G06N 3/04; G06N 3/08; G06T 7/10

USPC .......................................................... 382/156
See application file for complete search history.

(56) References Cited

U.S. PATENT DOCUMENTS

| 5,105,468 A | * | 4/1992 | Guyon | ................. | G06V 30/347 |
| | | | | | 382/187 |
| 2020/0302163 A1 | * | 9/2020 | Shi | ........................ | G06V 10/273 |
| 2021/0019911 A1 | * | 1/2021 | Kusakabe | ............... | G06F 3/011 |

OTHER PUBLICATIONS

"IAM Handwriting Database", Retrieved from: https://web.archive.org/web/20200920151852/http://www.fki.inf.unibe.ch/databases/iam-handwriting-database, Sep. 20, 2020, 3 Pages.

(Continued)

*Primary Examiner* — Amandeep Saini
(74) *Attorney, Agent, or Firm* — NovoTechIP International PLLC

(57) ABSTRACT

A data processing system for performing a semantic analysis of digital ink stroke data implements obtaining the digital ink stroke data representing handwritten text, drawings, or both; analyzing the digital ink stroke data to extract path signature feature information from the digital ink stroke data; analyzing the path signature feature information using a convolutional neural network (CNN) trained to perform a pixel-level sematic analysis of the digital ink stroke data and to output a pixel segmentation map with semantic prediction information for each pixel of digital ink stroke data; analyzing the pixel segmentation map to generate stroke-level semantic information using a pixel-to-stroke conversion model; and processing the digital ink stroke data based on the stroke-level semantic information.

20 Claims, 21 Drawing Sheets

(56) References Cited

OTHER PUBLICATIONS

"International Search Report and Written Opinion Issued in PCT Application No. PCT/US21/053447", dated Jan. 28, 2022, 13 Pages.

\* cited by examiner

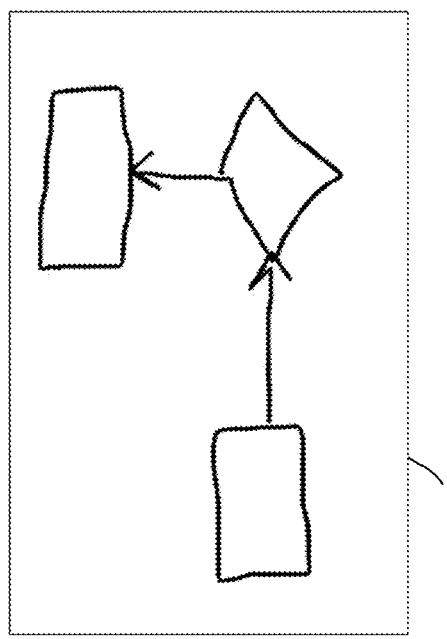
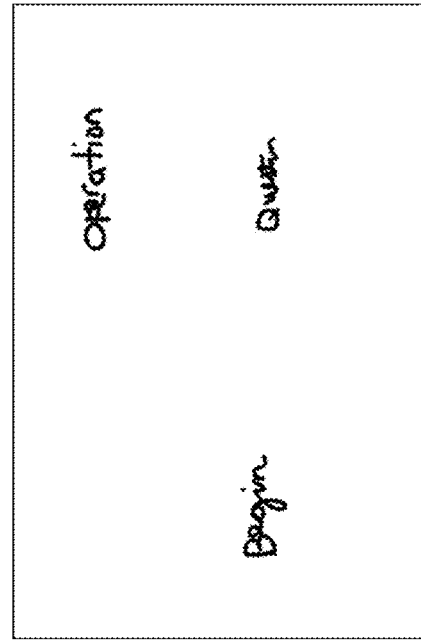
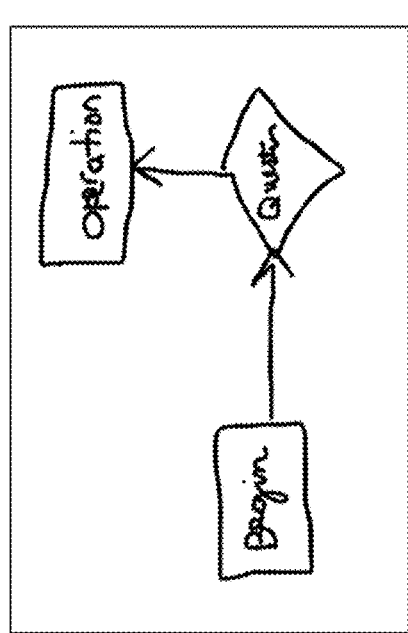
FIG. 2

Path Signature Feature (PSF)
0-th order PSF (describes geometrical location of strokes)
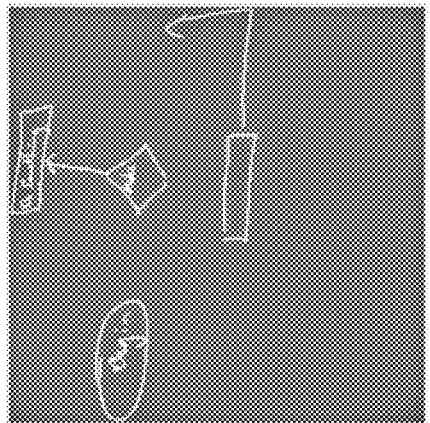
505
1-st order PSF (describes geometrical translation of stroke points)
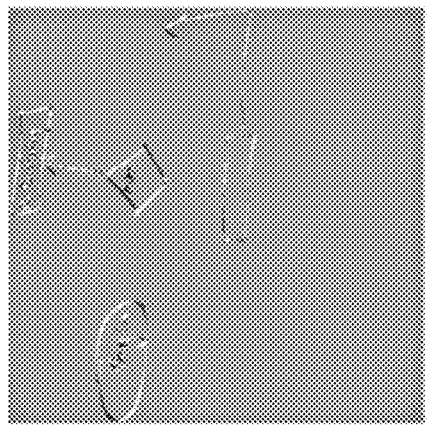
515
510
FIG. 5A

Path Signature Feature (PSF)
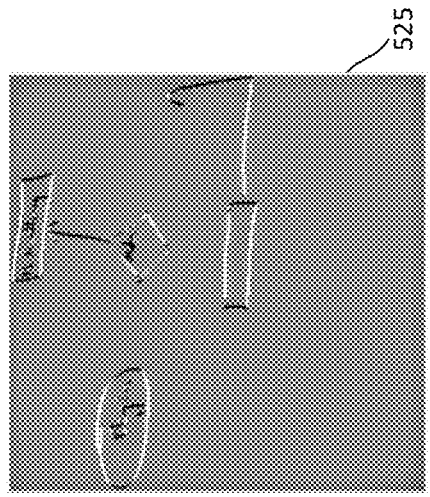
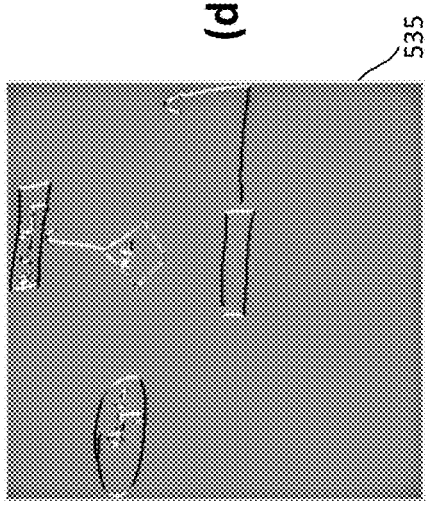
2-nd order PSF (describes curvature information)
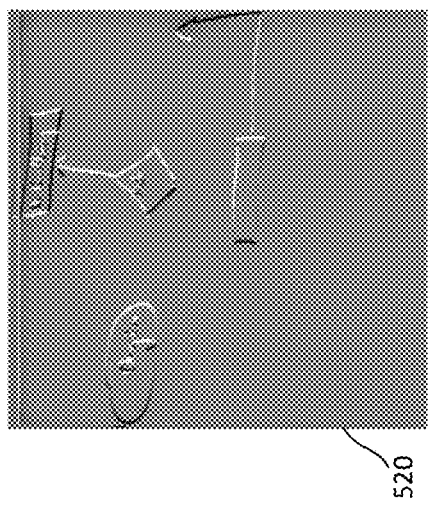
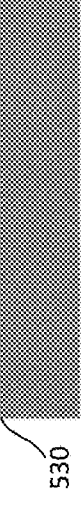
FIG. 5B

Path Signature Feature (PSF)

$S = \{((x_i, y_i)) | i = 1, 2, \cdots, T\}$.

For each smallest path $s_{i,i+1} = \{((x_i, y_i), (x_{i+1}, y_{i+1}))\}$ consisting of 2 consecutive points, the signature feature is calculated as follows:

$P_{i,i+1}^{(0)} = 1, P_{i,i+1}^{(1)} = (x_{i+1}, y_{i+1}) - (x_i, y_i)$, $P_{i,i+1}^{(2)} = \dfrac{P_{i,i+1}^{(1)} \otimes P_{i,i+1}^{(1)}}{2!}, P_{i,i+1}^{(3)} = \dfrac{P_{i,i+1}^{(1)} \otimes P_{i,i+1}^{(1)} \otimes P_{i,i+1}^{(1)}}{3!}$, $\vdots$ where $\otimes$ represents Kronecker matrix product

FIG. 6

Input Stroke Data

Writing Stroke Data

Poorly Prediction of Writing

FIG. 8A

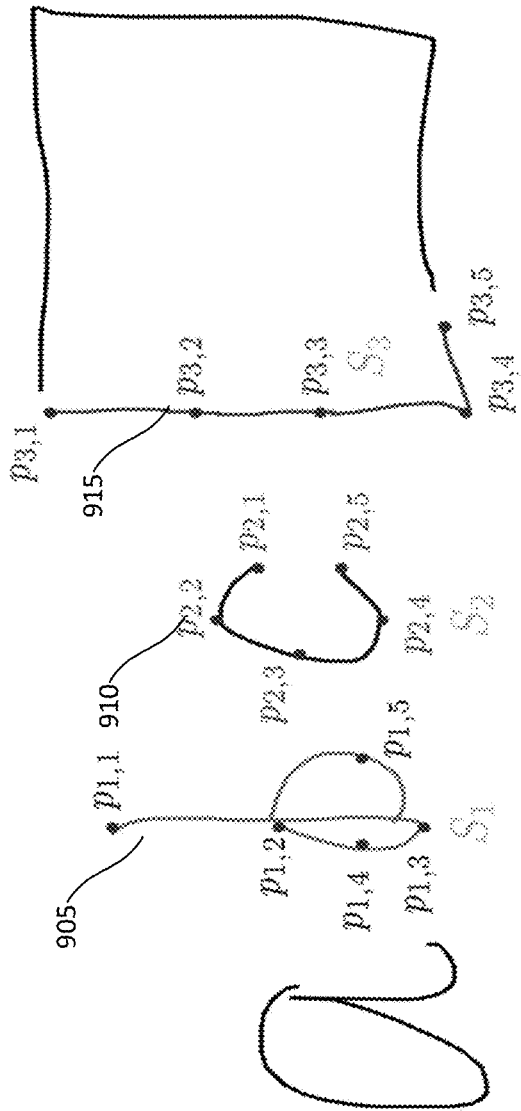

Training Data
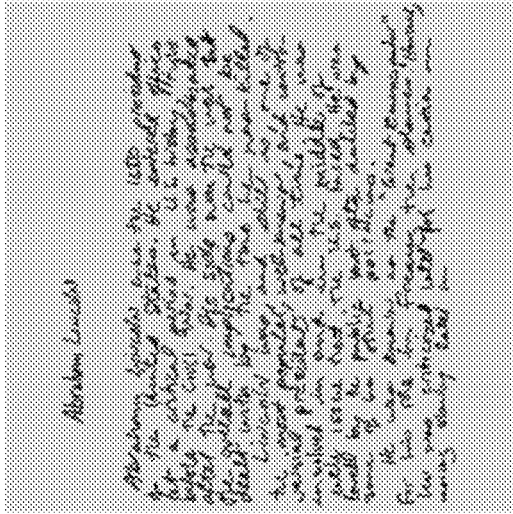 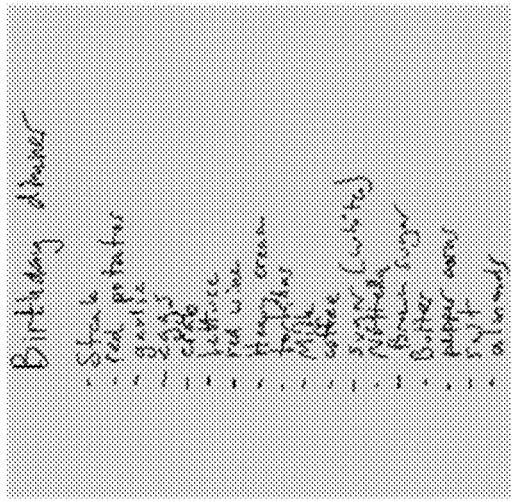
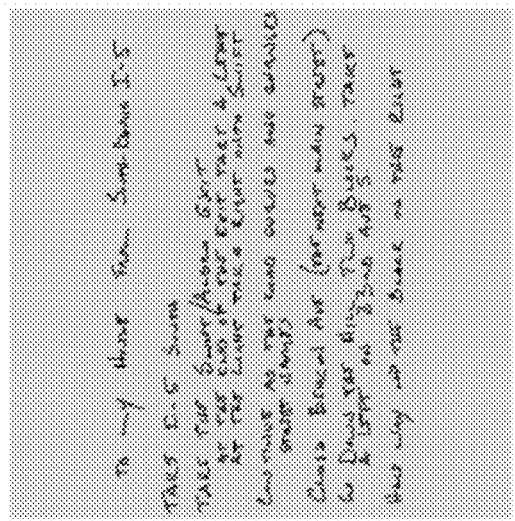 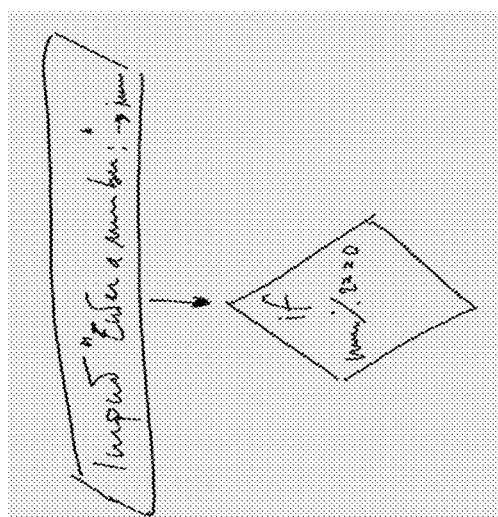
FIG. 12A

Test Data
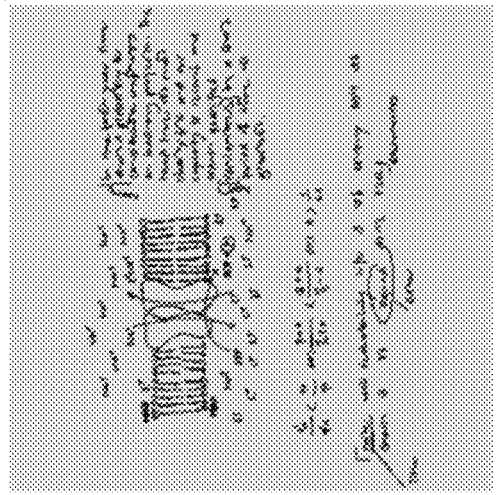
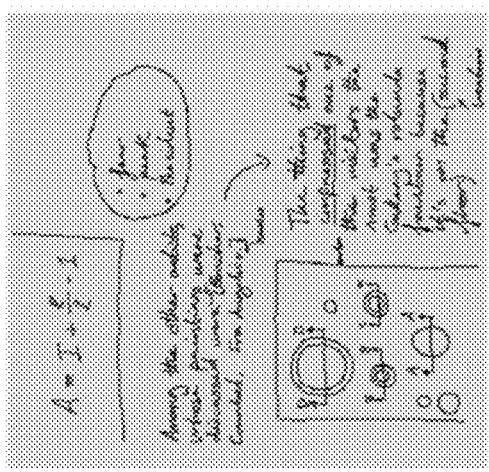
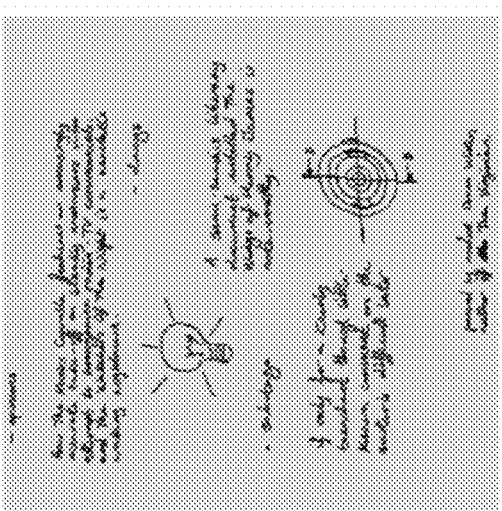
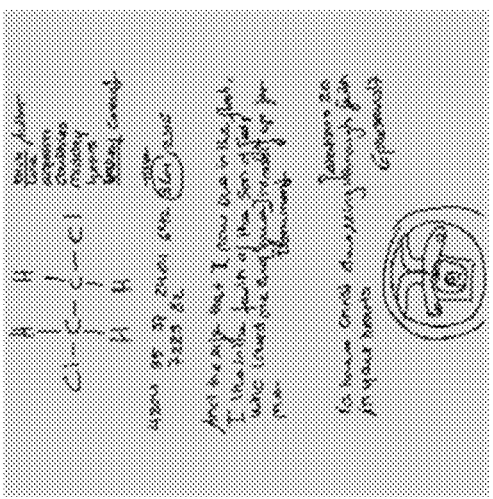
FIG. 12B

Augmented Training Data
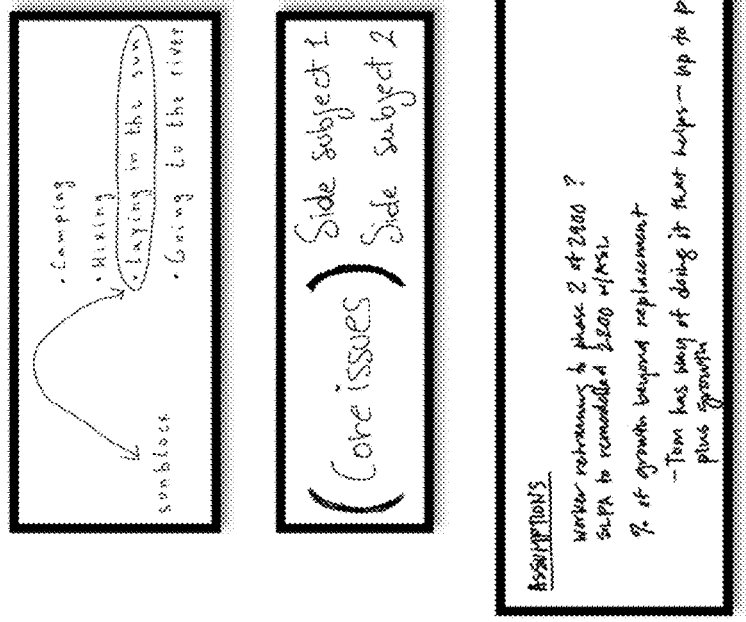
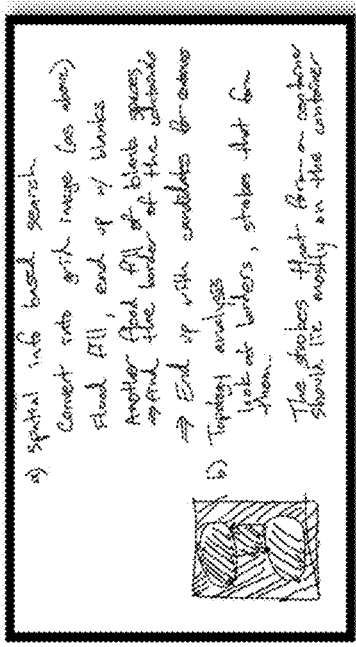
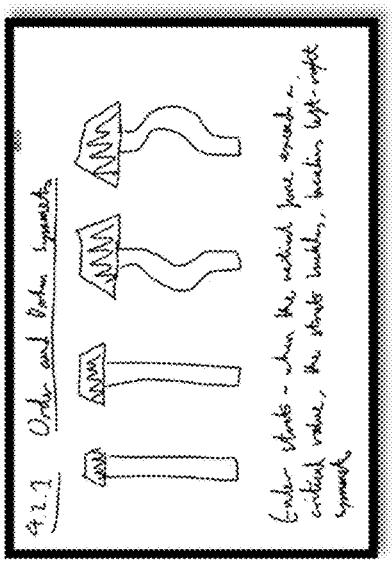
Free style drawings + intermingling of text and diagrams
Annotations
FIG. 12C

SEMANTIC SEGMENTATION FOR STROKE CLASSIFICATION IN INKING APPLICATION

BACKGROUND

Handwritten notes and/or other content are a natural means for capturing and conveying information. Such content may be a mix of handwritten text and drawings. Humans can readily read and understand the meaning of such notes. Attempts have been made to process and understand the meaning of such handwritten content on a computing device so that the written content may be utilized in various ways, such as but not limited to text recognition for understanding textual components of the handwritten content and drawing recognition for recognizing drawing elements of the handwritten content. However, current technology for classifying handwritten content as text or drawings often misclassifies written text or drawings. Hence, there is a need for improved systems and methods that provide a technical solution for solving the technical problem of how to improve the classification of such handwritten content.

SUMMARY

An example data processing system according to the disclosure may include a processor and a computer-readable medium storing executable instructions. The instructions when executed cause the processor to perform operations including obtaining digital ink stroke data representing handwritten text, drawings, or both; analyzing the digital ink stroke data to extract path signature feature information from the digital ink stroke data; analyzing the path signature feature information using a convolutional neural network (CNN) trained to perform a pixel-level sematic analysis of the digital ink stroke data and to output a pixel segmentation map with semantic prediction information for each pixel of digital ink stroke data; analyzing the pixel segmentation map to generate stroke-level semantic information using a pixel-to-stroke conversion model; and processing the digital ink stroke data based on the stroke-level semantic information.

An example method implemented in a data processing system for performing a semantic analysis of digital ink stroke data includes obtaining the digital ink stroke data representing handwritten text, drawings, or both; analyzing the digital ink stroke data to extract path signature feature information from the digital ink stroke data; analyzing the path signature feature information using a convolutional neural network (CNN) trained to perform a pixel-level sematic analysis of the digital ink stroke data and to output a pixel segmentation map with semantic prediction information for each pixel of digital ink stroke data; analyzing the pixel segmentation map to generate stroke-level semantic information using a pixel-to-stroke conversion model; and processing the digital ink stroke data based on the stroke-level semantic information.

An example computer-readable storage medium on which are stored instructions. The instructions when executed cause a processor of a programmable device to perform functions of obtaining digital ink stroke data representing handwritten text, drawings, or both; analyzing the digital ink stroke data to extract path signature feature information from the digital ink stroke data; analyzing the path signature feature information using a convolutional neural network (CNN) trained to perform a pixel-level sematic analysis of the digital ink stroke data and to output a pixel segmentation map with semantic prediction information for each pixel of digital ink stroke data; analyzing the pixel segmentation map to generate stroke-level semantic information using a pixel-to-stroke conversion model; and processing the digital ink stroke data based on the stroke-level semantic information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 shows an example stroke data and writing stroke data and drawing stroke data derived from the example stroke data.

FIGS. 5A and 5B are diagrams showing example of path signature feature tensor elements that may be determined by the stroke classification pipeline of FIG. 3.

FIG. 6 shows an example of how the elements of the path signature feature tensor of FIGS. 5A and 5B may be determined.

FIGS. 8A and 8B are diagrams of examples of poor prediction of writing strokes in handwritten text resulting from averaging of writing score predictions for sample pixels of a digital ink stroke.

FIG. 9 is a diagram showing how the U-Net trajectory feature information may be derived.

FIGS. 12A and 12B are examples of data that may be used to train and test the U-Net model used by the stroke classification pipeline.

FIGS. 12C, 12D, and 12E are examples showing augmenting of training data that may be used to train the U-Net model.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for semantic segmentation for stroke classification in digital inking applications presented herein provide a technical solution for solving the technical problem of determining whether an ink stroke is, for example, written text or a drawing. Understanding what is being drawn and/or written by a user is critical to the functionality of an inking application. The techniques described herein provide a technical solution to this problem by providing an improved stroke classification pipeline. The stroke classification pipeline extracts stroke path signature feature information from input stroke data, performs pixel level semantic segmentation on the path signature feature information, and performs a pixel to stroke conversion to determine the stroke type of each ink stroke in the input stroke data. The stroke classification pipeline considers the whole stroke rather than a single stroke point when predicting a final stroke classification. This approach can provide a significant improvement over current technologies for semantic segmentation for stroke classification of handwritten and hand drawn inputs. These and other technical benefits of the techniques disclosed herein will be evident from the discussion of the example implementations that follow.

Figure 1:
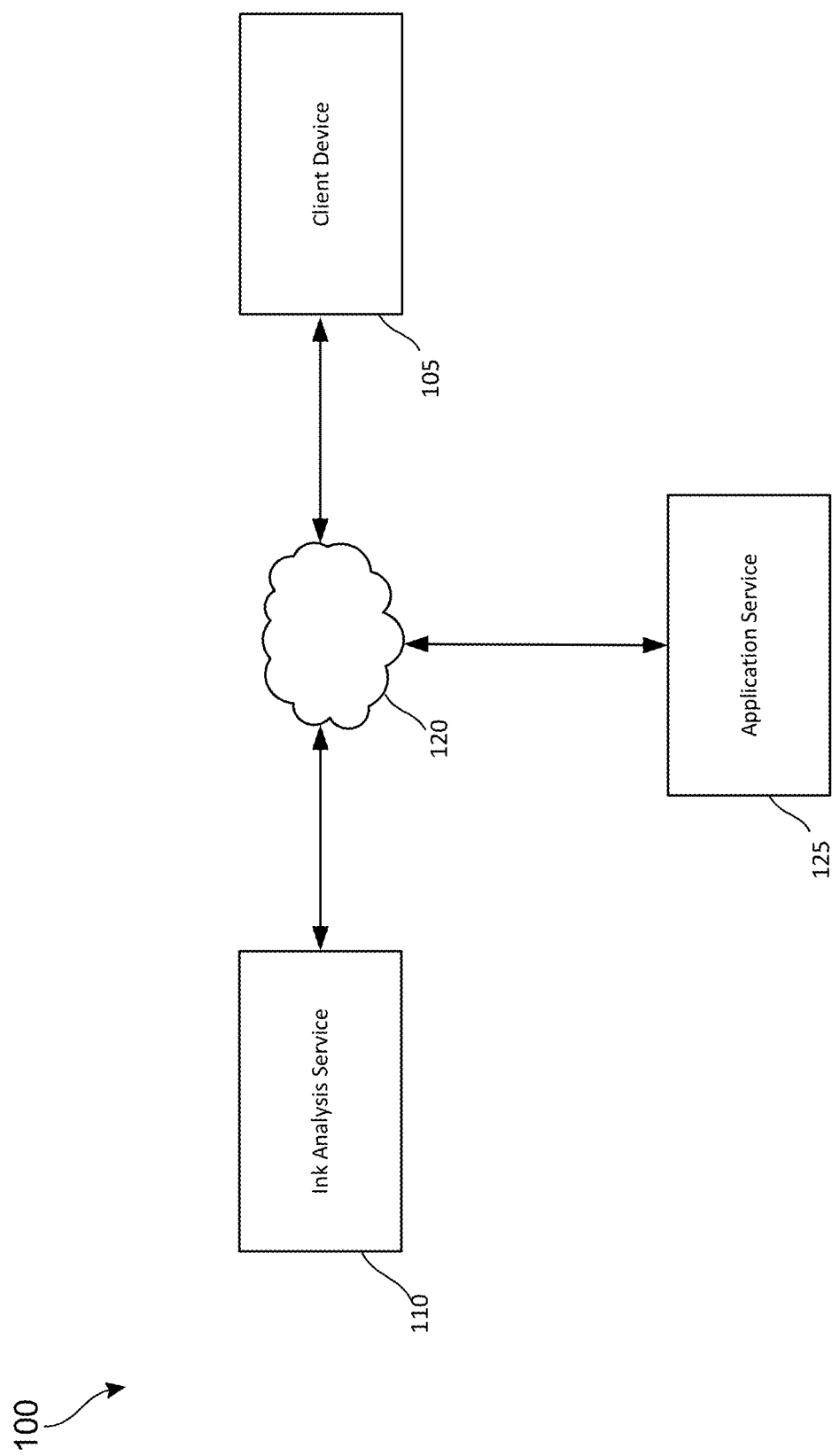
FIG. 1 is a diagram showing an example computing environment in which the techniques disclosed herein may be implemented.

FIG. 1 is a diagram showing an example computing environment 100 in which the techniques disclosed herein for semantic segmentation for stroke classification in digital inking applications may be implemented. The computing environment 100 may include an ink analysis service 110. The example computing environment 100 may also include a client device 105 and an application service 125. The client device 105 may communicate with the ink analysis service 110 and/or the application service 125 via the network 120.

In the example shown in FIG. 1, the ink analysis service 110 is implemented as a cloud-based service or set of services. The ink analysis service 110 may be configured to receive digital ink content from the client device 105 and/or the application service 125 to be analyzed and predictions made on whether the stroke data included therein includes handwriting strokes, drawings strokes, or a combination thereof. The ink analysis service 110 may also be configured to analyze the stroke data predicted to be handwriting strokes using a handwriting recognizer. The ink analysis service 110 may also be configured to analyze stroke data predicted to be drawing strokes to detect shapes included in the drawing data and to output information identifying the shapes detected therein.

The client device 105 is a computing device that may be implemented as a portable electronic device, such as a mobile phone, a tablet computer, a laptop computer, a portable digital assistant device, a portable game console, and/or other such devices. The client device 105 may also be implemented in computing devices having other form factors, such as a vehicle onboard computing system, a kiosk, a point of sale system, a video game console, a desktop computer, and/or other types of computing devices. While the example implementation illustrated in FIG. 1 includes one client device, other implementations may include multiple client devices.

The application service 125 may be a cloud-based application that allows the user to consume, create, and/or modify content. The application service 125 may be configured to receive digital ink stroke data that includes handwritten text, drawings, or both. The application service 125 may be a word processing program, a note taking application, a collaboration platform that provides facilities for users to share content and/or collaborate on creating new content, a messaging application, a drawing application, a two-dimensional (2D) and/or three-dimensional (3D) modeling application, and/or other types of applications that may be configured to receive ink strokes as an input. The ink strokes may be captured by a touch screen, drawing tablet, mouse, stylus, and/or other user interface element configured to capture ink stroke information including handwritten text and/or drawings. The application service 125 may use stroke classification information provided by the ink analysis service 110 to process the handwritten text and/or drawings provided by a user.

In the example shown in FIG. 1, the ink analysis service 110 is shown as a cloud-based service that may be accessed over a network. However, other implementations of the ink analysis service 110 may be achieved by the application service 125 or by the client device 105. For example, the application service 125 may implement an application that is configured to receive digital ink inputs and to analyze the digital ink input using the stroke classification techniques provided herein to identify handwriting and/or drawings input by a user. In other implementations, the functionality of the ink analysis service 110 and/or the application service 125 described herein may be carried out on the client device 105.

FIG. 2 shows an example stroke data and writing stroke data and drawing stroke data derived therefrom. The example implementations which follow provide a stroke classification pipeline 300 which may be configured to receive input stroke data 225 which may represent handwritten text and/or hand drawn drawings as shown in FIG. 2. The stroke classification pipeline 300 may predict whether a particular ink stroke is a drawing stroke or a writing stroke and output the drawing stroke data 230 and the writing stroke data 235 included in the input stroke data 225. The details of how the stroke classification pipeline 300 may be implemented are shown in FIG. 3.

Figure 3:
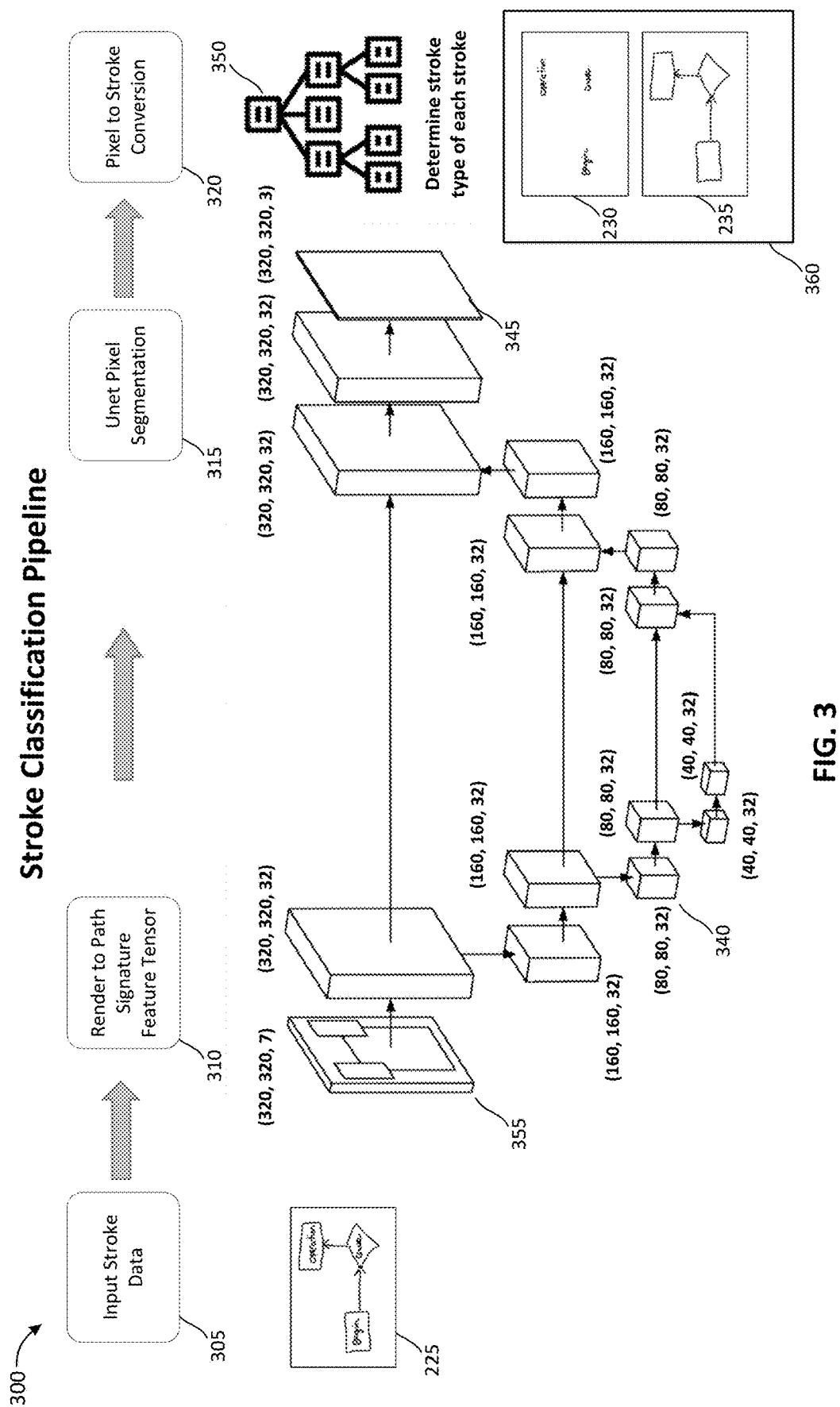
FIG. 3 is a diagram showing an example stroke classification pipeline according to the techniques provided herein.

FIG. 3 shows an example implementation of various elements of a stroke classification pipeline 300 that may be implemented by the ink analysis service 110. The stroke classification pipeline 300 may include multiple stages or operations, including an input stroke data operation 305, a render to path signature feature tensor operation 310, a U-Net pixel segmentation operation 315, and a pixel to stroke conversion operation 320. The stroke classification pipeline 300 may be implemented as software, hardware, or a combination thereof by the ink analysis service 110.

The stroke classification pipeline 300 may receive input stroke data 225 which may represent handwritten text and/or hand drawn drawings as shown in FIG. 2. The stroke classification pipeline 300 may predict whether a particular ink stroke is a drawing stroke or a writing stroke. The predictions provided by the stroke classification pipeline 300 may be used to identify the drawing stroke data 230 and the writing stroke data 235 included in the input stroke data 225. The input stroke data 225 may be processed by a handwriting processing unit configured to recognize the written text included therein, and the drawing stroke data 230 may be processed by a drawing processing unit to detect various shapes and/or objects included therein.

In operation 305, the stroke classification pipeline 300 may receive input stroke data 225 that represents handwritten text and/or hand drawn drawings. The input stroke data 225 may be captured using a touch screen, touch screen, drawing tablet, mouse, stylus, and/or another user interface element. The input stroke data 225 may be received as an image data file in various formats. The image data file may represent input stroke data as a 2D array of pixels that represent the input stroke data 225. In the example shown in FIG. 3, the input stroke data 225 is represented by a 320-pixel by 320-pixel array of pixel data. The input stroke data may be preprocessed by the stroke classification pipeline 300 to resize the input stroke data to size that the components which follow expect to receive.

In operation 310, the input stroke data 225 is processed to render a path signature feature (PSF) tensor 355 that may be provided as an input to a U-Net 340 for processing. The U-Net 340 is a modified convolutional neural network that was developed for biomedical image segmentation and provides fast and precise segmentation of images. The U-Net 340 used by the stroke classification pipeline 300 may be trained using training data that includes examples of handwritten text and/or drawings. The text and drawings may be intermingled in the training data, because such intermingling of textual and drawing elements may be encountered in examples to be analyzed by the stroke classification pipeline 300. FIG. 2 shows an example of a simple diagram in which text and drawing elements are intermingled. FIGS. 12A, 12B, and 12C show more complex examples of the types of training data that may be used to train and/or test the training of the U-Net 340. The training data is used to train the U-Net 340 to provide a semantic determination for each pixel of input stroke data 225. U-Net 340 provides a technical benefit of requiring fewer training images to train the network and to yield more precise segmentations that a typical fully convolutional network. In the example shown in FIG. 3, the U-Net 340 makes a prediction for each pixel of the input stroke data 225 whether that pixel is associated with a stroke that is a writing stroke. From this information we can infer which strokes of the input stroke data 225 are drawing strokes. The U-Net 340 may be implemented using the customized U-Net described in U.S. patent application Ser. No. 16/360,006 entitled "Object Detection and Segmentation for Inking Application" filed on Mar. 20, 2019, which is incorporated by reference.

The PSF tensor 355 includes feature information extracted from the input stroke image data 225. The PSF tensor 355 may include the features shown in FIGS. 5A and 5B. These features may be extracted from the input stroke image data 225 using the techniques shown in FIG. 6. The PSF tensor 355 includes information that describes the input stroke data 225 to permit the U-Net 340 to segment the input stroke data 225 as will be discussed in greater detail below. In the example shown in FIG. 3, the tensor includes seven elements. FIGS. 5A and 5B show examples of the elements of the PSF tensor 355. The PSF tensor 355 includes 0-th order path signature features 505, which describe the geometrical location of the ink strokes that make up the input stroke data 225. The PSF tensor 355 also includes 1st order path signature features 510 and 515, which describe the geometrical translation of the stroke points that make up the input stroke data 225. The PSF tensor 355 also includes 2nd order path signature features 520, 525, 530, and 535, which describe curvature information for the ink path signatures. The examples which follow describe how each of these elements of the PSF tensor 355 may be determined.

In operation 315, the PSF tensor 355 is provided as an input to the U-Net 340 and the U-Net 340 outputs a pixel segmentation map 345. The U-Net 340 outputs the pixel segmentation map 345, which includes a prediction whether each pixel (also referred to herein as "stroke points") included therein are a drawing pixel or a handwriting pixel.

In operation 320, the pixel segmentation map 345 may be analyzed using a pixel to stroke conversion (PSC) model 350 to further improve the accuracy of the predictions output by the U-Net 340. The PSC model 350 is configured to use the pixel-wise results from the U-Net 340 to recreate the strokes of the input stroke data 225. The output 360 from the PSC model 350 may provide a final determination of the type of each of the strokes of the input stroke data 225. For example, the PSC model 350 may make a final determination of whether a particular stroke is a handwriting stroke or a drawing stroke and may include the drawing stroke data 230 and the writing stroke data 235. The PSC model 350 may be implemented using a Gradient Boosting Tree (GBT) as will be discussed in greater detail in the examples which follow.

Figure 4A:
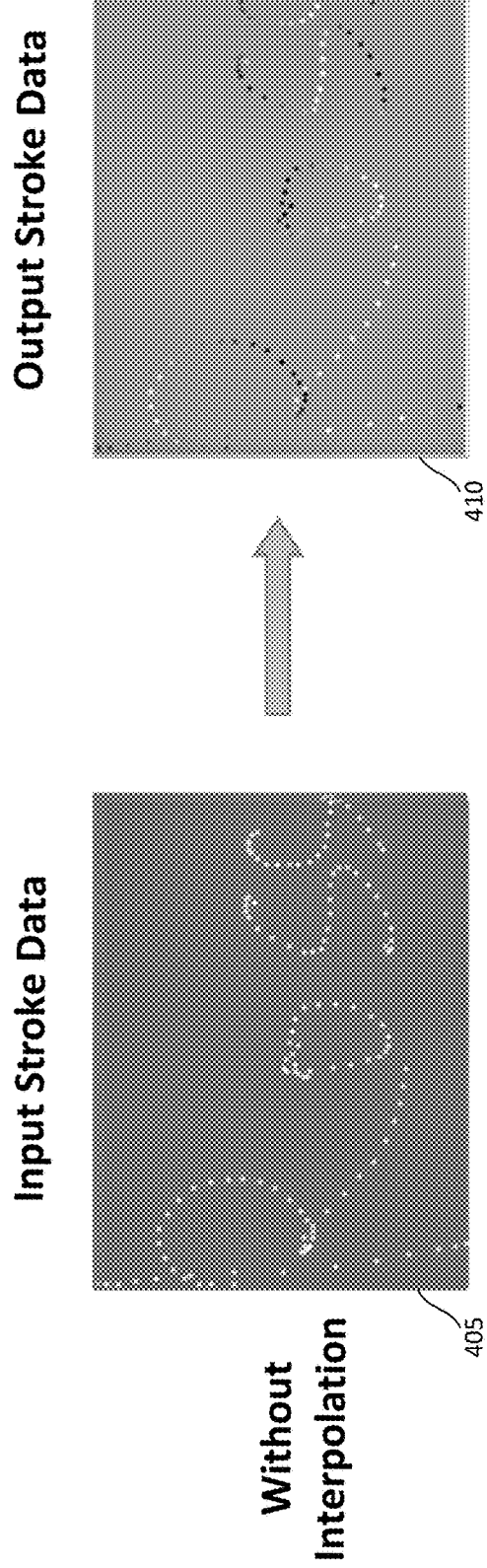
FIGS. 4A and 4B are diagrams of examples of interpolation that may be performed when determining the path signature feature tensor elements that may be determined by the stroke classification pipeline of FIG. 3.
Figure 4B:
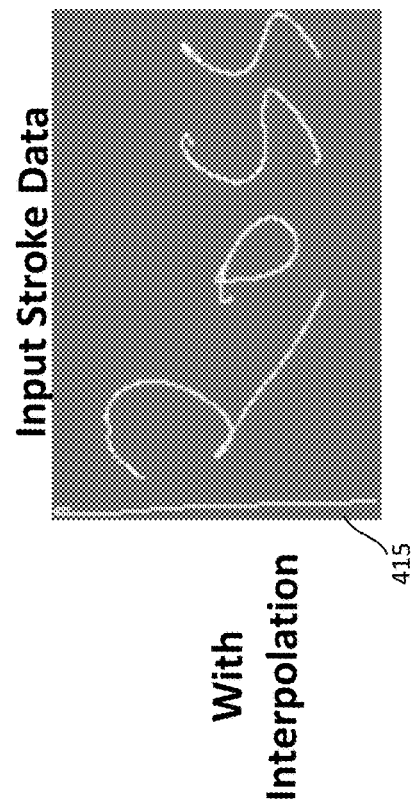

FIGS. 4A and 4B show examples of how the stroke classification pipeline 300 may utilize interpolation to calculate a reliable invariant PSF tensor 355. It is seen that without interpolation being applied to the input stroke data, the number of points that represent the stroke data may be insufficient to provide a smooth stroke path. Input stroke data 405 shown in FIG. 4A has not had interpolation applied, and the resulting output stroke data 410 is discontinuous. Input stroke data 415 shown in FIG. 4B has had interpolation applied, and the resulting output stroke data 420 is continuous. The application of interpolation can make the stroke path of a digital ink stroke appear smoother. The stroke classification pipeline 300 may be configured to use uniform distance sampling to interpolate enough points along the stroke path that stroke path is smoothed. The stroke classification pipeline 300 may be configured to select a sampling distance between two adjacent points of the stroke path for uniform distance sampling by scaling the whole stroke to a fixed height and a fixed width. The sampling distance may then be selected to be 1. As can be seen in the output stroke data 420, the pixels corresponding to stroke points have been normalized to a value within a range of [−1,1] while the background pixels are kept at a zero value. The stroke classification pipeline 300 may perform this interpolation on the input stroke data 225 prior to the input stroke data being processed to calculate the PSF tensor 355 as shown in FIG. 6.

FIG. 6 shows an example of how the stroke classification pipeline 300 may calculate the PSF tensor 355 described in FIG. 3. The path signature feature data may be defined as strokes along a path along X and Y coordinates of a 2D plane. A stroke S (element 605 in FIG. 6) may be determined by the equation 1:

$$S=\{(x_i,y_i)|i=1,2,\ldots,T\} \quad \text{(equation 1)}$$

where $x_i$ represents the x coordinate of an i-th point along the stroke path and $y_i$ represents the y coordinate of i-th point along the stroke path, and where the value of i is at least two (indicating that there are at least two points along the stroke path).

The 0-th order PSF 610 and the 1st order PSF 615 shown in FIG. 6 may be determined by the equation 2:

$$P_{i,i+1}^{(0)}=1, P_{i,i+1}^{(1)}=(x_{i+1},y_{i+1})-(x_i,y_i) \quad \text{(equation 2)}$$

The 2nd order PSF 620 shown in FIG. 6 may be determined by the equation 3:

$$P_{i,i+1}^{(2)} = \frac{P_{i,i+1}^{(1)} \otimes P_{i,i+1}^{(1)}}{2!}, P_{i,i+1}^{(2)} = \frac{P_{i,i+1}^{(1)} \otimes P_{i,i+1}^{(1)} \otimes P_{i,i+1}^{(2)}}{3!} \quad \text{(equation 3)}$$

where ⊗ represents Kronecker matrix product.

The stroke classification pipeline 300 may use the equations 1-3 to determine the values included in the PSF tensor 355, which may then be provided as an input to the U-Net 340 for segmentation.

Figure 7:
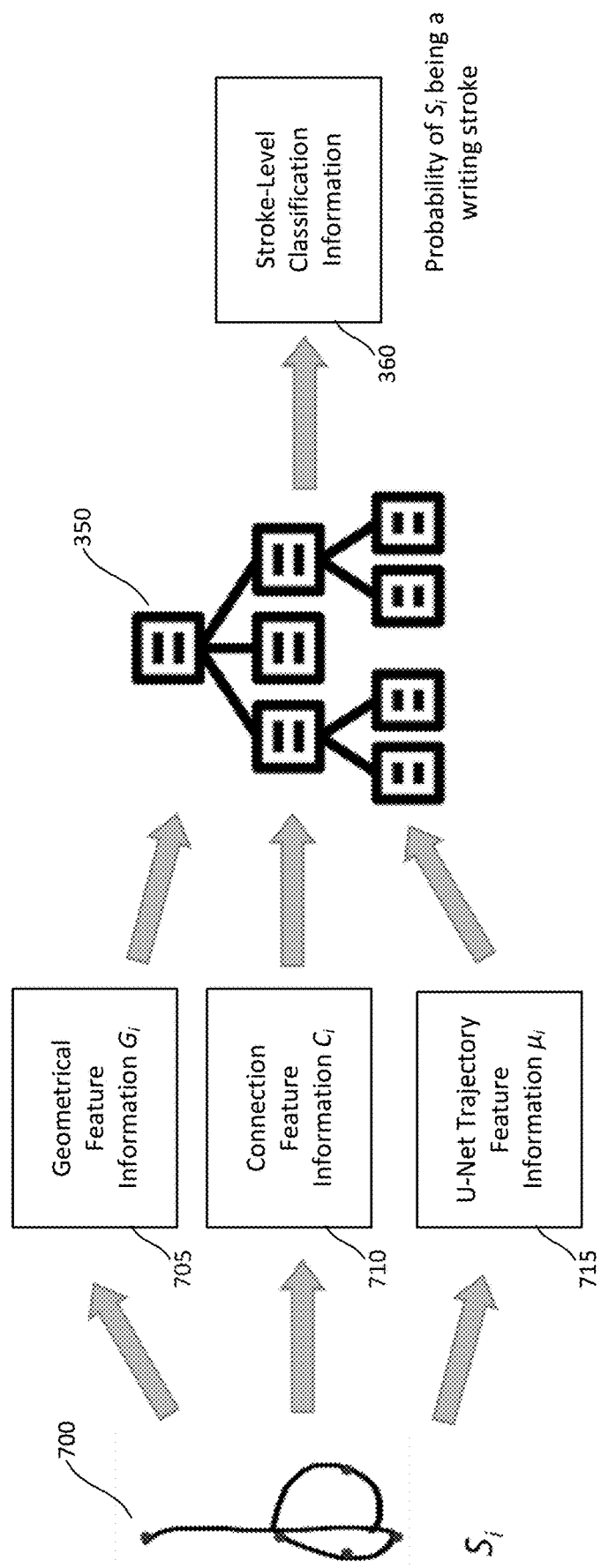
FIG. 7 shows addition details of the information that may be provided to the pixel to stroke conversion model of the stroke classification pipeline.

FIG. 7 shows addition details of the information that may be provided to the PSC model 350. The PSC model 350 may be configured to receive information for a stroke $S_i$ 700 and to generate stroke-level classification information 360 that provides a probability of the stroke $S_i$ 700 being a writing stroke. The PSC model 350 may be configured to receive three types of feature information associated with the stroke $S_i$ 700 that may be used to determine whether the stroke is a writing stroke or a drawing stroke: (1) geometrical feature information $G_i$ 705, (2) connection feature information $C_i$ 710, and (3) U-Net trajectory feature information $\mu_i$ 715. The examples that follow describe how this feature information may be generated by the stroke classification pipeline 300. The stroke classification pipeline 300 may include a feature extraction module (not shown) that is configured to extract the feature information provided as an input to the PSC model 350.

Figure 8A:
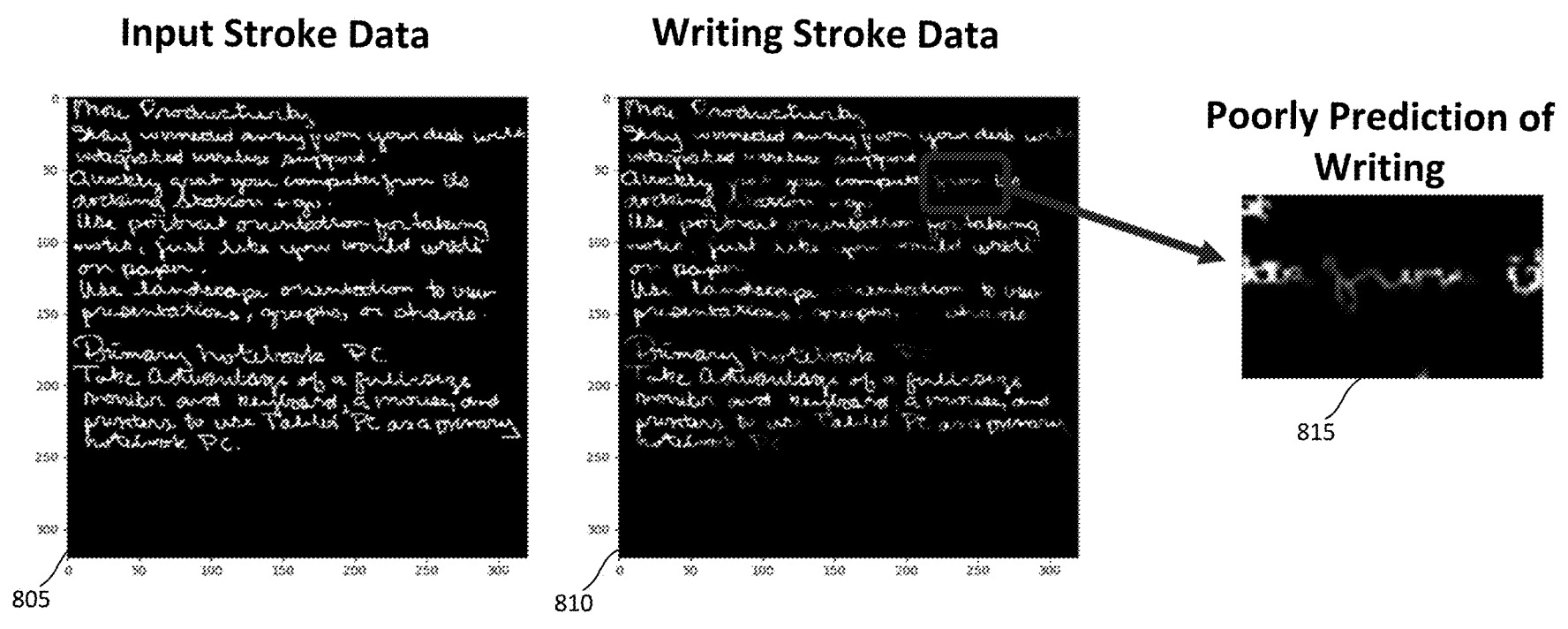
Figure 8B:
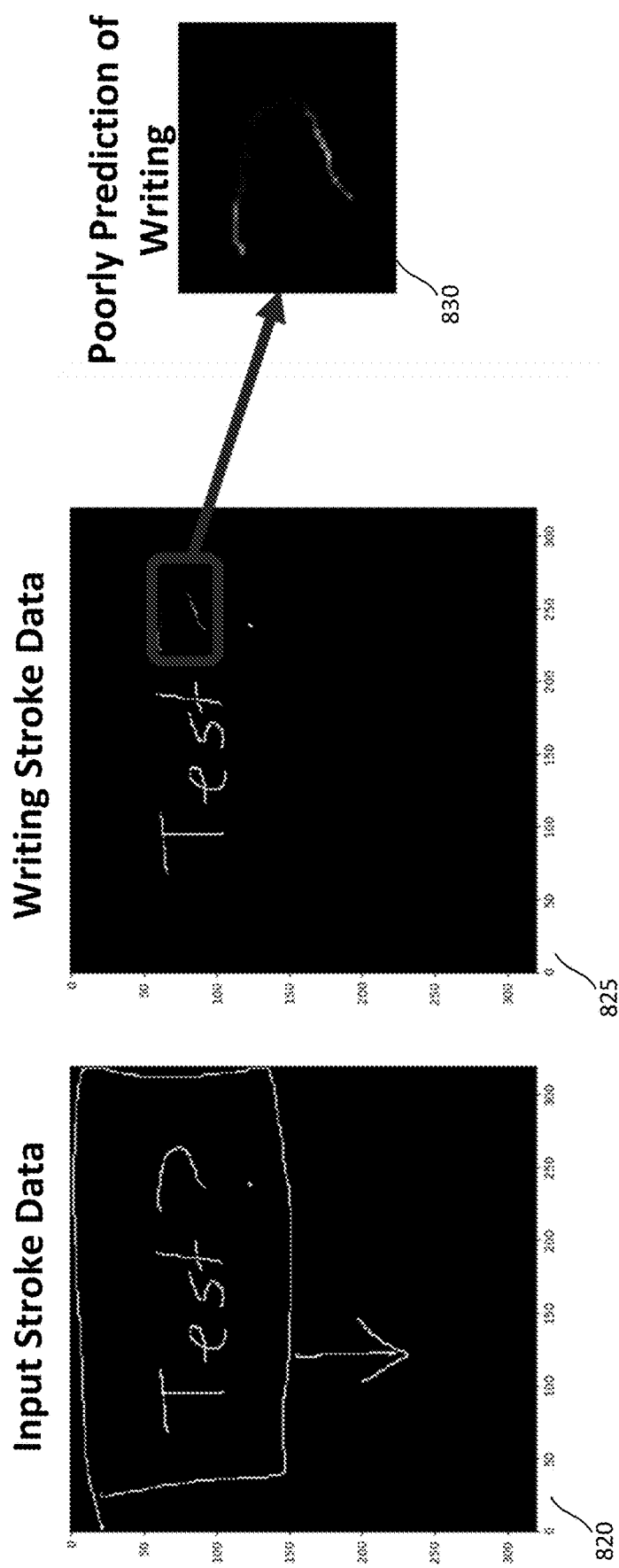

As discussed in the preceding examples, the PSC model 350 may be implemented as a gradient boosting tree. FIGS. 8A and 8B illustrate how the use of gradient boosting tree of the PSC model 350 can help the stroke classification pipeline 300 generate more reliable and accurate stroke classifications. Relying on the pixel segmentation map 345 alone is not sufficient for providing accurate stroke level characterization. Furthermore, averaging the writing score predictions generated by the U-Net 340 for each of the pixels that are part of the stroke has also been shown to not provide a sufficiently accurate result. However, FIGS. 8A and 8B show that this approach may not always be sufficiently accurate. Instead, the U-Net 340 may use the model compression method described in "Neural Network Compression via Sparse Optimization" by Tianyi Chen, Bo Ji, Yixin Shi, Tianyu Ding, Biyi Fang, Sheng Yi, Xiao Tu (2020). The model compression method described therein may be used to prune the heavy net into a smaller one for efficient inference.

FIG. 8A shows an input stroke data 805 and the resulting writing stroke data 810 determined using the approach in which the writing score predictions from the pixel segmentation map 345 were averaged. The highlighted region 815 shows additional details of the circled region of the writing stroke data 810 which demonstrates that the averaging approach may produce poor predictions on whether a particular stroke is a writing stroke. Strokes having a higher probability of being a writing stroke are rendered in the writing stroke data 810 with a more intensely white pixel coloration. As can be seen in the highlighted region 815, the prediction of the presence of textual content in the highlighted area could be significantly improved.

FIG. 8B shows another example in which input stroke data 820 and the resulting writing stroke data 825 determined using the approach in which the writing score predictions from the pixel segmentation map 345 were averaged. The highlighted region 830 shows additional details of the circled region of the writing stroke data 825 which demonstrates that the averaging approach may produce poor predictions whether a particular stroke is a writing stroke. The examples shown in FIGS. 8A and 8B show that such heuristic averaging of the predictions from the pixel segmentation map 345 is not sufficient to predict whether a stroke is a drawing stroke or a writing stroke.

FIG. 9 shows an example of how the U-Net trajectory feature information $\mu_i$ 715 may be determined. Each pixel in the stroke trajectory is predicted with a probability of the stroke being a part of a writing stroke. To obtain the U-Net trajectory feature, each stroke is uniformly sampled such that each of the strokes is represented by the same number of stroke points. In the example shown in FIG. 9, each stroke is represented by five stroke points, but in other implementations greater or fewer stroke points may be used to represent each stroke. The stroke points p in FIG. 9 are numbered according to the stroke which they are associated, and the point number associated with that stroke. For example, stroke $S_1$ 905 is associated with points $p_{1,1}$, $p_{1,2}$, $p_{1,3}$, $p_{1,4}$, and $p_{1,5}$. The U-Net predicted score from the pixel segmentation map 345 is collected for each stroke point to form a U-Net trajectory for each stroke. To determine the stroke type of $S_2$ 910, we consider both the U-Net trajectory of its previous stroke $S_1$ and its next stroke $S_3$ 915. We denote the feature as $\mu$.

Each stroke has a U-Net trajectory which is of a fixed size N, where N represents the number of points at which each stroke is sampled. In the example shown in FIG. 9, the value of N is 5 because five stroke points are sampled. The U-Net trajectory for stroke $S_2$ 910 may be determined by concatenating the vectors of the previous stroke $S_1$ 905 and the next stroke $S_3$ 915 to the vector of stroke points for the stroke $S_2$ 910 to form a vector of size 3N.

Figure 10:
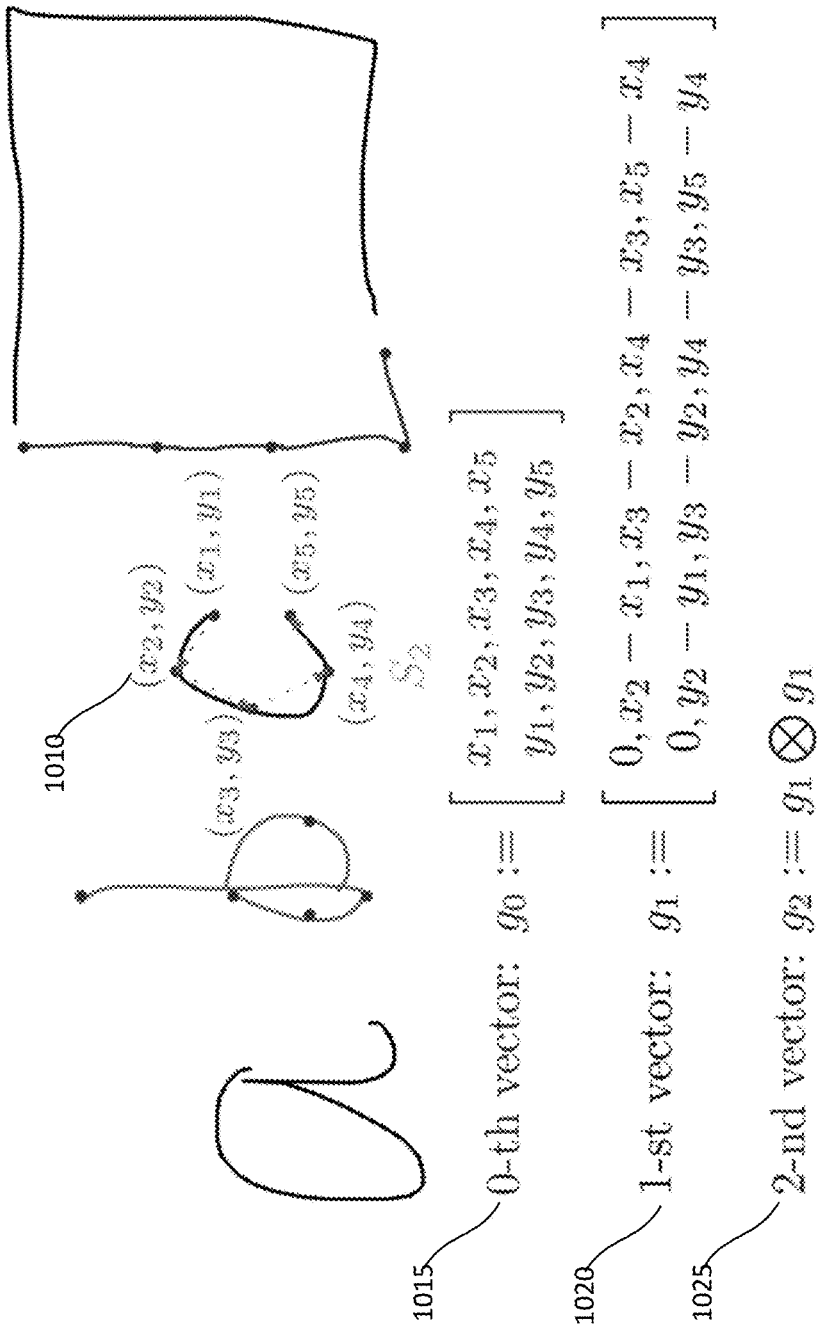
FIG. 10 is a diagram showing how the geometrical feature information may be derived.

FIG. 10 shows an example of how the geometrical feature information $G_i$ 705 may be determined. Each pixel is extracted with a vector of features that are related to the shape of this stroke. To obtain the geometrical feature, each stroke is uniformly sampled such that each of the strokes is represented by the same number of stroke points as in the preceding example. The stroke points in FIG. 10 are represented by a set of x and y coordinates associated with each point, so that stroke 2 1010 include points $(x_1, y_1)$, $(x_2, y_2)$, $(x_3, y_3)$, $(x_4, y_4)$, and $(x_5, y_5)$. In the example shown in FIG. 10, each stroke is represented by five stroke points, but in other implementations greater or fewer stroke points may be used to represent each stroke. A 0-th order vector 1015, a 1st order vector 1020, and a 2nd order vector 1025 are determined for each stroke as shown in FIG. 10. The 2nd order vector 1025 is determined by calculating the Kronecker matrix product of the 0-th order vector 1015 and the 1st order vector 10. All three geometrical features for each stroke are denoted as G and are provided as the geometrical features input to the PSC model 350.

Figure 11:
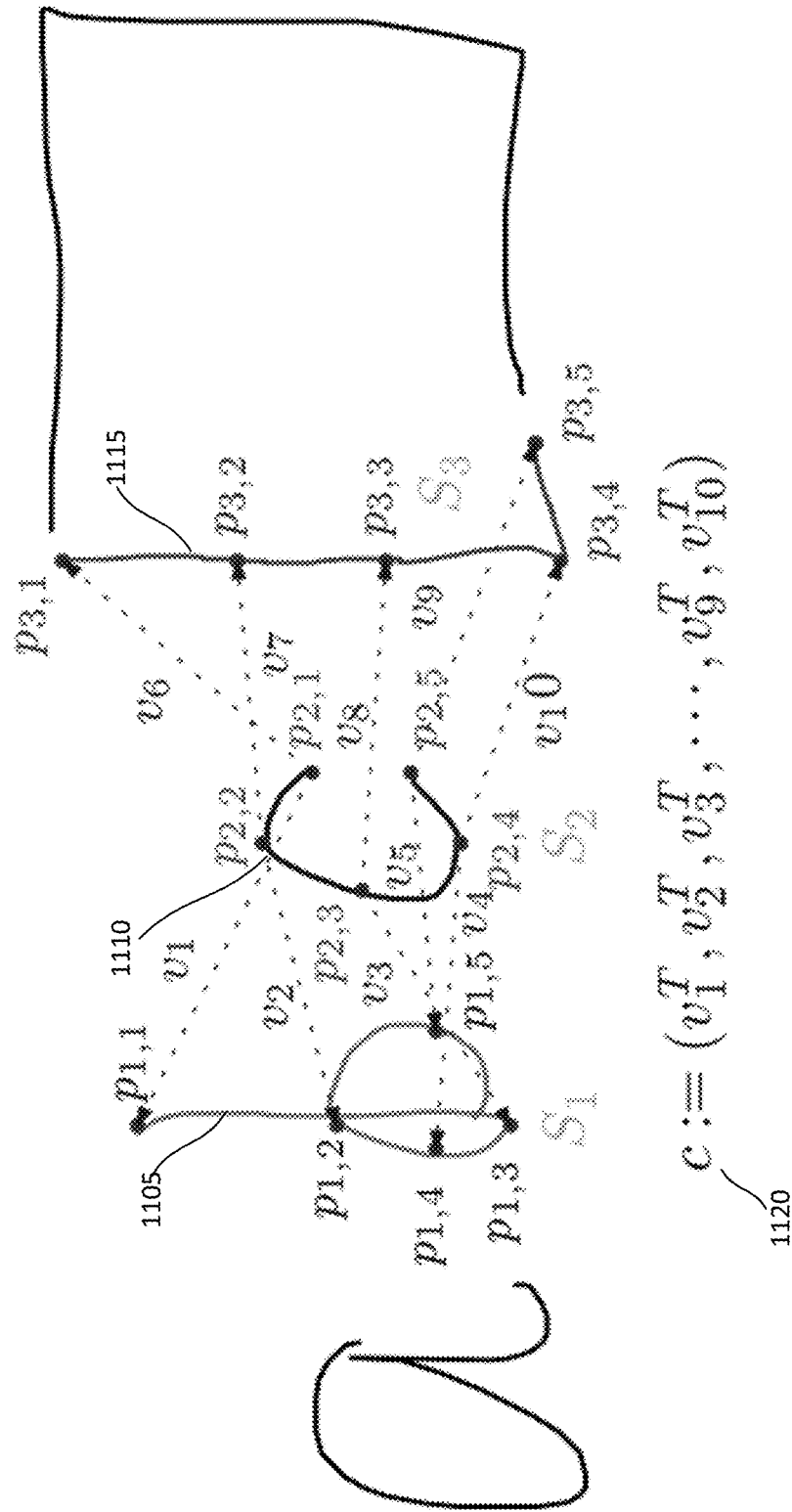
FIG. 11 is a diagram showing how the connection feature information may be derived.

FIG. 11 shows an example of how the connection feature information $C_i$ 710 may be determined. To obtain the geometrical feature, each pixel is extracted with a vector of features that are related to its corresponding pixel in the previous and the next stroke in chronological writing order. In the example shown in FIG. 11, there are three strokes $S_1$ 1105, $S_2$ 1110, and $S_3$ 1115 for which the connection features information is determined. The stroke points p in FIG. 11 are numbered according to the stroke which they are associated, and the point number associated with that stroke. For example, stroke $S_1$ is associated with points $p_{1,1}$, $p_{1,2}$, $p_{1,3}$, $p_{1,4}$, and $p_{1,5}$.

The points on stroke $S_1$ are connected by vectors to the corresponding points on the stroke $S_2$. The vector $v_1$ connects the point $p_{1,1}$ of stroke $S_1$ to the point $p_{2,1}$ of stroke $S_2$. The vector $v_2$ connects the point $p_{1,2}$ of stroke $S_1$ to the point $p_{2,2}$ of stroke $S_2$. The vector $v_3$ connects the point $p_{1,3}$ of stroke $S_1$ to the point $p_{2,3}$ of stroke $S_2$. The vector $v_4$ connects the point $p_{1,4}$ of stroke $S_1$ to the point $p_{2,4}$ of stroke $S_2$. The vector $v_5$ connects the point $p_{1,5}$ of stroke $S_1$ to the point $p_{2,5}$ of stroke $S_2$. Furthermore, the vector $v_6$ connects the point $p_{2,1}$ of stroke $S_2$ to the point $p_{3,1}$ of stroke $S_3$. The vector $v_7$ connects the point $p_{2,2}$ of stroke $S_2$ to the point $p_{3,2}$ of stroke $S_3$. The vector $v_8$ connects the point $p_{2,3}$ of stroke $S_2$ to the point $p_{3,3}$ of stroke $S_3$. The vector $v_9$ connects the point $p_{2,4}$ of stroke $S_2$ to the point $p_{3,4}$ of stroke $S_3$. The vector $v_{10}$ connects the point $p_{2,1}$ of stroke $S_2$ to the point $p_{3,1}$ of stroke $S_3$. The vectors extracted may be collected as the connection features c 1120 shown in FIG. 11. The connection features c 1120 may be provided as one of the three feature inputs to the PSC model 350 as another source of information making a semantic determination for a stroke of the digital ink data.

Data augmentation is another aspect of the techniques implemented herein. Two data sets are used with the U-Net 340: a training dataset and a test dataset. The training dataset is used to train the model and the test dataset is benchmark data used to determine whether the U-Net 340 is operating as expected once trained. FIG. 12A shows four examples of training data that include handwritten text and drawings. The training data includes lists of data. The examples shown in FIG. 12A illustrate the types of data that may be included in the training dataset and are not meant to be exhaustive. The training dataset used to train the U-Net 340 may utilize many more examples. FIG. 12B shows examples of a test dataset. The examples shown here are obtained from the publicly available IAM handwriting dataset of handwritten English text which can be used to train and test handwriting text recognizers. The IAM handwriting dataset may be obtained from the Research Group on Computer Vision and Artificial Intelligence INF, University of Bern.

As can be seen from the examples shown in FIG. 12B, the test data includes a rich mixture of textual content and drawing components, ink annotations, and intermingling of drawings and textual content. The data augmentations techniques described herein may be used to address three gaps between the training data and the test data. First, the data augmentation techniques may be used to address a drawing style gap between the test data and the training data. The drawings and/or textual content in the test data tended to be more confined while the test dataset included more free drawing patterns. Second, the test data includes various types of annotations, such as underlining, circling, strikethrough, and other type of annotations. Such annotations may be lacking in the training data. Third, the test data includes intermingling of the handwritten text and drawings. In contrast, the training data may lack such intermingling of text and drawings.

Figure 12D:
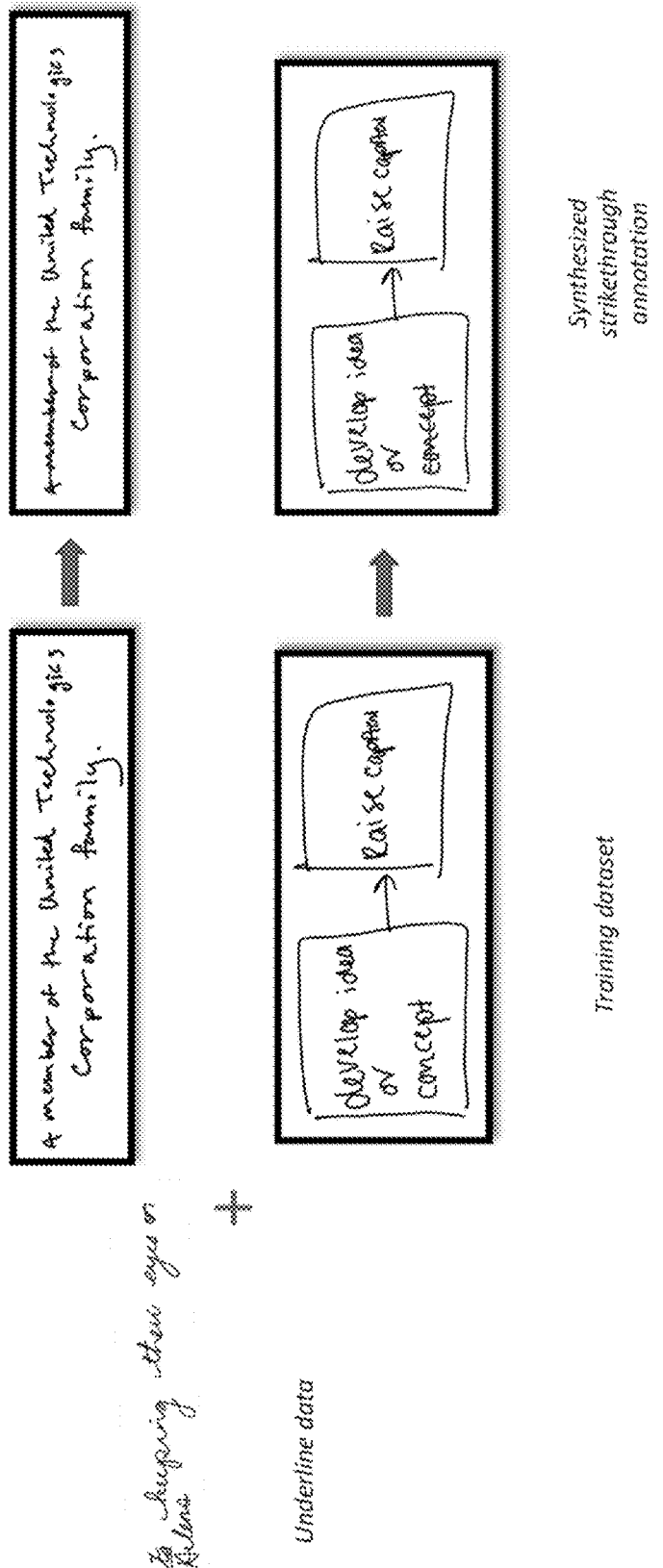
Figure 12E:

FIG. 12C shows examples of augmented training data that may be collected that includes more free drawing/writing style, more drawing and text intermingling, and more annotations. FIG. 12D shows an example in which existing training data may be augmented by adding underlining, strikethrough, and/or other types of annotation to the training data. The ink analysis service 110 may include a training data augmentation module that is configured to automatically add annotations to existing training data. FIG. 12E shows another example of data augmentation in which drawing elements and/or connector elements from diagrams may be extracted from test data that includes such elements and added to existing training data. The connectors and/or other drawing elements may be randomly added to existing training data to provide augmented training data for training the U-Net 340 to recognize such annotations. The ink analysis service 110 may be configured to analyze extract such drawing elements from the test data and store the elements in a training data augmentation data store. The ink analysis service 110 may then retrieve such annotations from the data store for augmenting existing training data.

Figure 13:
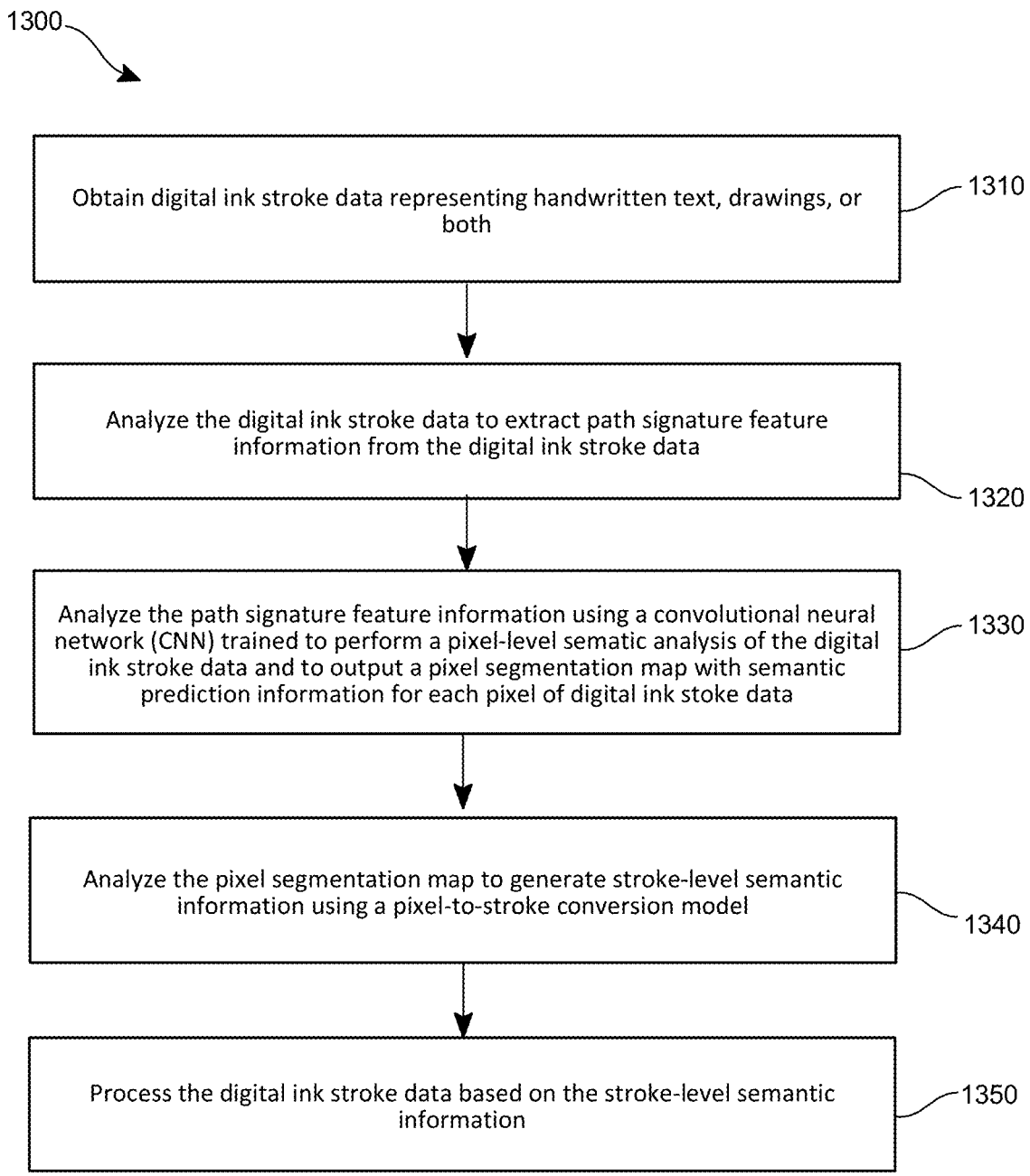
FIG. 13 is a flow chart of an example process for performing a semantic analysis of digital ink stroke data.

FIG. 13 is a flow chart of an example process 1300 for performing a semantic analysis of digital ink stroke data. The process 1300 may be implemented by the ink analysis service 110 and/or the stroke classification pipeline 300.

The process 1300 may include an operation 1310 of obtaining digital ink stroke data representing handwritten text, drawings, or both. As discussed in the preceding examples, the client device 105, and application operating on the client device 105, and/or an application operating on the application service 125 may capture digital ink stroke data that may include handwritten text, drawings, or both. The data may be captured and provided to the ink analysis service 110 for processing substantially in real time. In other implementations, the digital ink stroke data may be obtained in advance and processed later. For example, a user may capture handwritten notes during a meeting and request that that notes be processed by the ink analysis service 110 after the meeting to identify and/or extract text and/or drawing content from the notes.

The process 1300 may include an operation 1320 of analyzing the digital ink stroke data to extract path signature feature information from the digital ink stroke data. As discussed above with respect to FIGS. 3, 5A, and 5B, the path signature feature information may be extracted from the digital ink stroke data to generate a path signature feature tensor that be provided to the U-Net 340 as an input.

The process 1300 may include an operation 1330 of analyzing the path signature feature information using a convolutional neural network (CNN) trained to perform a pixel-level sematic analysis of the digital ink stroke data and to output a pixel segmentation map with semantic prediction information for each pixel of digital ink stroke data. The CNN may be the U-Net 340. The U-Net 340 outputs the pixel segmentation map that provides a prediction for each pixel whether the pixel is part of a writing stroke included in the digital ink stroke data.

The process 1300 may include an operation 1340 of analyzing the pixel segmentation map to generate stroke-level semantic information using a pixel-to-stroke conversion model. As discussed above with respect to FIGS. 3, 7, and 9-11, the pixel-to-stroke conversion model may be implemented by a Gradient Boosting Tree, which may analyze geometrical feature information 705, connection feature information 710, and U-Net trajectory feature information 715 to generate stroke-level classification information for each of the strokes included in the digital ink stroke data.

The process 1300 may include an operation 1350 of processing the digital ink stroke data based on the stroke-level semantic information. The stroke-level semantic information may be used to identify which portions of the digital ink stroke data correspond to textual input and which portions correspond to drawings. The portions associated with textual input may be provided to a handwriting processing unit of the ink analysis service 110 to identify the textual content of the handwriting. The handwriting processing unit may be configured to use one or more machine learning models and/or statistical models configured to identify the text of the handwriting. The handwriting processing unit may be configured to recognize handwritten content in multiple languages and may include models for analyzing the handwritten content in more than one language. The ink analysis service 110 may also include a drawing processing unit that is configured to identify drawing components of the digital ink stroke data. The drawing processing unit may be configured to use one or more machine learning models and/or statistical models configured to identify the drawing components of the digital ink stroke data. For example, the drawing processing unit may be configured to identify shapes and/or objects included in the digital ink stroke data.

The detailed examples of systems, devices, and techniques described in connection with FIGS. 1-13 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-13 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 14:
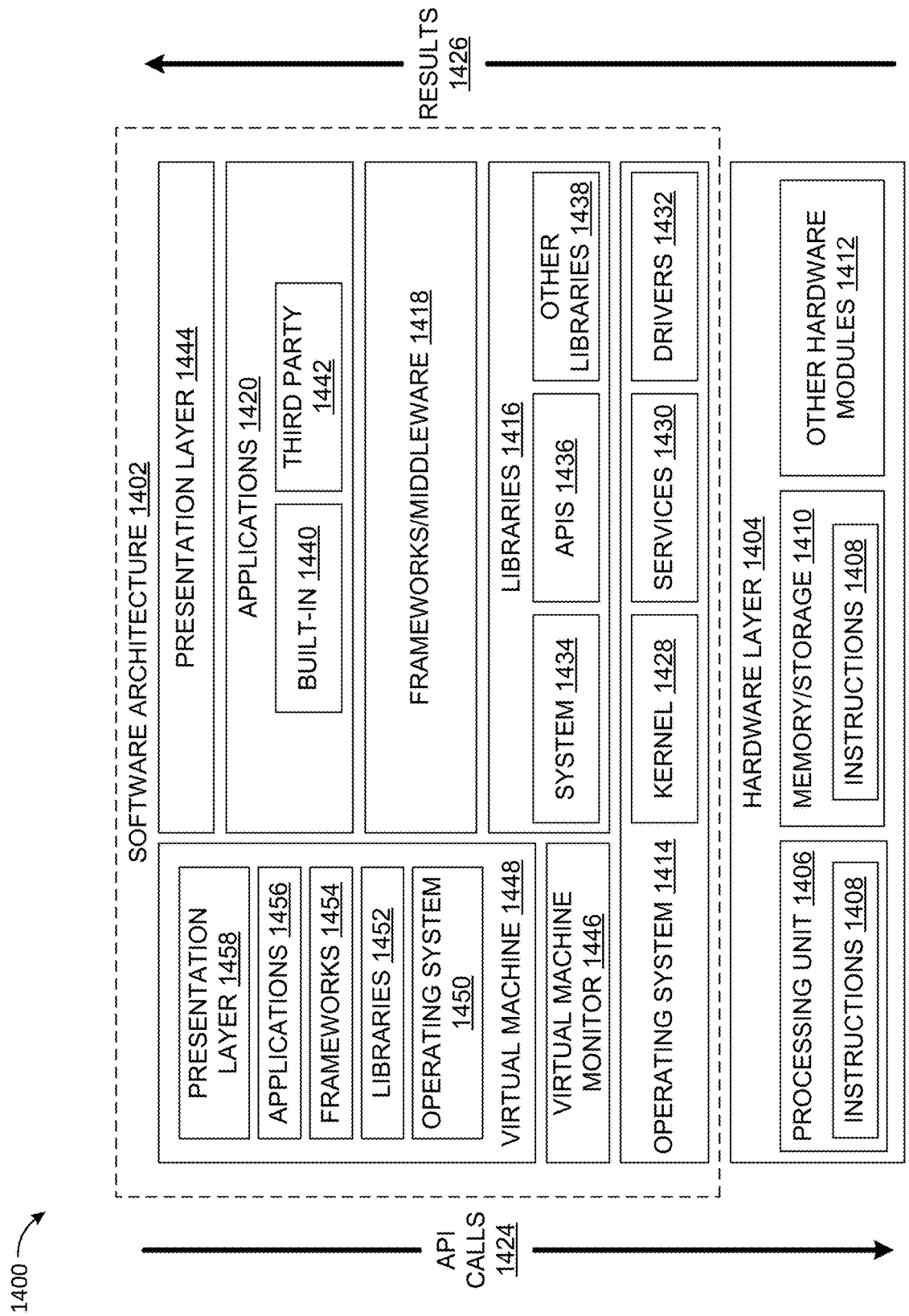
FIG. 14 is a block diagram showing an example software architecture, various portions of which may be used in conjunction with various hardware architectures herein described, which may implement any of the described features.

FIG. 14 is a block diagram 1400 illustrating an example software architecture 1402, various portions of which may be used in conjunction with various hardware architectures herein described, which may implement any of the above-described features. FIG. 14 is a non-limiting example of a software architecture and it will be appreciated that many other architectures may be implemented to facilitate the functionality described herein. The software architecture 1402 may execute on hardware such as a machine 1500 of FIG. 15 that includes, among other things, processors 1510, memory 1530, and input/output (I/O) components 1550. A representative hardware layer 1404 is illustrated and can represent, for example, the machine 1500 of FIG. 15. The representative hardware layer 1404 includes a processing unit 1406 and associated executable instructions 1408. The executable instructions 1408 represent executable instructions of the software architecture 1402, including implementation of the methods, modules and so forth described herein. The hardware layer 1404 also includes a memory/storage 1410, which also includes the executable instructions 1408 and accompanying data. The hardware layer 1404 may also include other hardware modules 1412. Instructions 1408 held by processing unit 1406 may be portions of instructions 1408 held by the memory/storage 1410.

The example software architecture 1402 may be conceptualized as layers, each providing various functionality. For example, the software architecture 1402 may include layers and components such as an operating system (OS) 1414, libraries 1416, frameworks 1418, applications 1420, and a presentation layer 1444. Operationally, the applications 1420 and/or other components within the layers may invoke API calls 1424 to other layers and receive corresponding results 1426. The layers illustrated are representative in nature and other software architectures may include additional or different layers. For example, some mobile or special purpose operating systems may not provide the frameworks/middleware 1418.

The OS 1414 may manage hardware resources and provide common services. The OS 1414 may include, for example, a kernel 1428, services 1430, and drivers 1432. The kernel 1428 may act as an abstraction layer between the hardware layer 1404 and other software layers. For example, the kernel 1428 may be responsible for memory management, processor management (for example, scheduling), component management, networking, security settings, and so on. The services 1430 may provide other common services for the other software layers. The drivers 1432 may be responsible for controlling or interfacing with the underlying hardware layer 1404. For instance, the drivers 1432 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1416 may provide a common infrastructure that may be used by the applications 1420 and/or other components and/or layers. The libraries 1416 typically provide functionality for use by other software modules to perform tasks, rather than rather than interacting directly with the OS 1414. The libraries 1416 may include system libraries 1434 (for example, C standard library) that may provide functions such as memory allocation, string manipulation, file operations. In addition, the libraries 1416 may include API libraries 1436 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1416 may also include a wide variety of other libraries 1438 to provide many functions for applications 1420 and other software modules.

The frameworks 1418 (also sometimes referred to as middleware) provide a higher-level common infrastructure that may be used by the applications 1420 and/or other software modules. For example, the frameworks 1418 may provide various graphic user interface (GUI) functions, high-level resource management, or high-level location services. The frameworks 1418 may provide a broad spectrum of other APIs for applications 1420 and/or other software modules.

The applications 1420 include built-in applications 1440 and/or third-party applications 1442. Examples of built-in applications 1440 may include, but are not limited to, a contacts application, a browser application, a location application, a media application, a messaging application, and/or a game application. Third-party applications 1442 may include any applications developed by an entity other than the vendor of the particular platform. The applications 1420 may use functions available via OS 1414, libraries 1416, frameworks 1418, and presentation layer 1444 to create user interfaces to interact with users.

Some software architectures use virtual machines, as illustrated by a virtual machine 1448. The virtual machine 1448 provides an execution environment where applications/modules can execute as if they were executing on a hardware machine (such as the machine 1500 of FIG. 15, for example). The virtual machine 1448 may be hosted by a host OS (for example, OS 1414) or hypervisor, and may have a virtual machine monitor 1446 which manages operation of the virtual machine 1448 and interoperation with the host operating system. A software architecture, which may be different from software architecture 1402 outside of the virtual machine, executes within the virtual machine 1448 such as an OS 1450, libraries 1452, frameworks 1454, applications 1456, and/or a presentation layer 1458.

Figure 15:
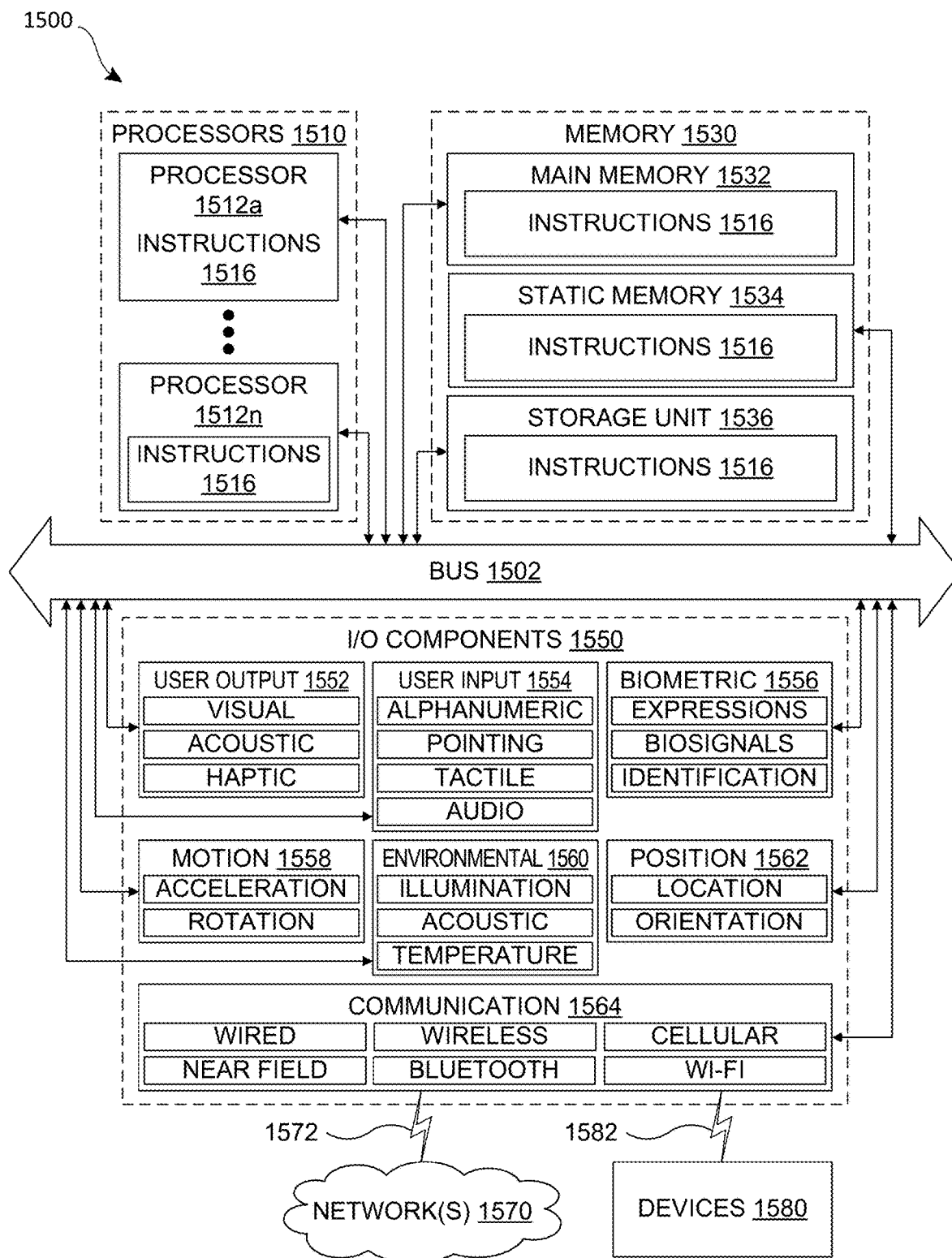
FIG. 15 is a block diagram showing components of an example machine configured to read instructions from a machine-readable medium and perform any of the features described herein.

FIG. 15 is a block diagram illustrating components of an example machine 1500 configured to read instructions from a machine-readable medium (for example, a machine-readable storage medium) and perform any of the features described herein. The example machine 1500 is in a form of a computer system, within which instructions 1516 (for example, in the form of software components) for causing the machine 1500 to perform any of the features described herein may be executed. As such, the instructions 1516 may be used to implement modules or components described herein. The instructions 1516 cause unprogrammed and/or unconfigured machine 1500 to operate as a particular machine configured to carry out the described features. The machine 1500 may be configured to operate as a standalone device or may be coupled (for example, networked) to other machines. In a networked deployment, the machine 1500 may operate in the capacity of a server machine or a client machine in a server-client network environment, or as a node in a peer-to-peer or distributed network environment. Machine 1500 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1500 is illustrated, the term "machine" includes a collection of machines that individually or jointly execute the instructions 1516.

The machine 1500 may include processors 1510, memory 1530, and I/O components 1550, which may be communicatively coupled via, for example, a bus 1502. The bus 1502 may include multiple buses coupling various elements of machine 1500 via various bus technologies and protocols. In an example, the processors 1510 (including, for example, a central processing unit (CPU), a graphics processing unit (GPU), a digital signal processor (DSP), an ASIC, or a suitable combination thereof) may include one or more processors 1512*a* to 1512*n* that may execute the instructions 1516 and process data. In some examples, one or more processors 1510 may execute instructions provided or identified by one or more other processors 1510. The term "processor" includes a multi-core processor including cores that may execute instructions contemporaneously. Although FIG. 15 shows multiple processors, the machine 1500 may include a single processor with a single core, a single processor with multiple cores (for example, a multi-core processor), multiple processors each with a single core, multiple processors each with multiple cores, or any combination thereof. In some examples, the machine 1500 may include multiple processors distributed among multiple machines.

The memory/storage 1530 may include a main memory 1532, a static memory 1534, or other memory, and a storage unit 1536, both accessible to the processors 1510 such as via the bus 1502. The storage unit 1536 and memory 1532, 1534 store instructions 1516 embodying any one or more of the functions described herein. The memory/storage 1530 may also store temporary, intermediate, and/or long-term data for processors 1510. The instructions 1516 may also reside, completely or partially, within the memory 1532, 1534, within the storage unit 1536, within at least one of the processors 1510 (for example, within a command buffer or cache memory), within memory at least one of I/O components 1550, or any suitable combination thereof, during execution thereof. Accordingly, the memory 1532, 1534, the storage unit 1536, memory in processors 1510, and memory in I/O components 1550 are examples of machine-readable media.

As used herein, "machine-readable medium" refers to a device able to temporarily or permanently store instructions and data that cause machine 1500 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1516) for execution by a machine 1500 such that the instructions, when executed by one or more processors 1510 of the machine 1500, cause the machine 1500 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1550 may include a wide variety of hardware components adapted to receive input, provide output, produce output, transmit information, exchange information, capture measurements, and so on. The specific I/O components 1550 included in a particular machine will depend on the type and/or function of the machine. For example, mobile devices such as mobile phones may include a touch input device, whereas a headless server or IoT device may not include such a touch input device. The particular examples of I/O components illustrated in FIG. 15 are in no way limiting, and other types of components may be included in machine 1500. The grouping of I/O components 1550 are merely for simplifying this discussion, and the grouping is in no way limiting. In various examples, the I/O components 1550 may include user output components 1552 and user input components 1554. User output components 1552 may include, for example, display components for displaying information (for example, a liquid crystal display (LCD) or a projector), acoustic components (for example, speakers), haptic components (for example, a vibratory motor or force-feedback device), and/or other signal generators. User input components 1554 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1550 may include biometric components 1556, motion components 1558, environmental components 1560, and/or position components 1562, among a wide array of other physical sensor components. The biometric components 1556 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1558 may include, for example, acceleration sensors (for example, an accelerometer) and rotation sensors (for example, a gyroscope). The environmental components 1560 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1562 may include, for example, location sensors (for example, a Global Position System (GPS) receiver), altitude sensors (for example, an air pressure sensor from which altitude may be derived), and/or orientation sensors (for example, magnetometers).

The I/O components 1550 may include communication components 1564, implementing a wide variety of technologies operable to couple the machine 1500 to network(s) 1570 and/or device(s) 1580 via respective communicative couplings 1572 and 1582. The communication components 1564 may include one or more network interface components or other suitable devices to interface with the network(s) 1570. The communication components 1564 may include, for example, components adapted to provide wired communication, wireless communication, cellular communication, Near Field Communication (NFC), Bluetooth communication, Wi-Fi, and/or communication via other modalities. The device(s) 1580 may include other machines or various peripheral devices (for example, coupled via USB).

In some examples, the communication components 1564 may detect identifiers or include components adapted to detect identifiers. For example, the communication components 1564 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1562, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a computer-readable medium storing executable instructions that, when executed, cause the processor to perform operations comprising:
obtaining digital ink stroke data representing handwritten text, drawings, or both;
analyzing the digital ink stroke data to extract path signature feature information from the digital ink stroke data;
analyzing the path signature feature information using a convolutional neural network (CNN) trained to perform a pixel-level semantic analysis of the digital ink stroke data and to output a pixel segmentation map with semantic prediction information for each pixel of digital ink stroke data;
analyzing the pixel segmentation map to generate stroke-level semantic information using a pixel-to-stroke conversion model, the pixel-to-stroke conversion model being trained to recreate ink strokes in the digital ink stroke data from the pixel segmentation map and to generate the stroke-level semantic information from the recreated ink strokes; and
processing the digital ink stroke data based on the stroke-level semantic information.

2. The data processing system of claim 1, wherein, to analyze the digital ink stroke data to extract the path signature feature information from the digital ink stroke data, the computer-readable medium further comprises instructions to cause the processor to perform operations comprising:
determining geometric information for each respective stroke of the digital ink stroke data, the geometric information including geometrical locations of stroke points of each respective stroke, geometrical translation of stroke points for each respective stroke, and curvature information for each respective stroke.

3. The data processing system of claim 1, wherein the CNN is a U-Net.

4. The data processing system of claim 1, wherein the pixel segmentation map comprises, for each pixel, a prediction of whether the pixel is associated with a writing stroke.

5. The data processing system of claim 1, wherein the pixel-to-stroke conversion model comprises a Gradient Boosting Tree.

6. The data processing system of claim 5, wherein, to analyze the pixel segmentation map to generate the stroke-level semantic information, the computer-readable medium further comprises instructions to cause the processor to perform operations comprising:
determining stroke feature data from the pixel segmentation map and the path signature feature information; and
providing the stroke feature data to the pixel-to-stroke conversion model.

7. The data processing system of claim 6, wherein, to determine the stroke feature data, the computer-readable medium further comprises instructions to cause the processor to perform operations comprising:
determining geometrical feature information for a stroke of the digital ink stroke data by sampling a set of coordinates of the stroke and determining geometric relationships between the set of coordinates.

8. The data processing system of claim 6, wherein, to determine the stroke feature data, the computer-readable medium further comprises instructions to cause the processor to perform operations comprising:
determining trajectory feature information for each stroke of a set of strokes of the digital ink stroke data by sampling a set of points from the pixel segmentation map to obtain the prediction information for each pixel of digital ink stroke data.

9. A data processing system comprising:
a processor; and
a computer-readable medium storing executable instructions that, when executed, cause the processor to perform operations comprising:
obtaining digital ink stroke data representing handwritten text, drawings, or both;
analyzing the digital ink stroke data to extract path signature feature information from the digital ink stroke data;
analyzing the path signature feature information using a convolutional neural network (CNN) trained to perform a pixel-level semantic analysis of the digital ink stroke data and to output a pixel segmentation map with semantic prediction information for each pixel of digital ink stroke data;
analyzing the pixel segmentation map to generate stroke-level semantic information using a pixel-to-stroke conversion model comprising a Gradient Boosting Tree by
determining stroke feature data from the pixel segmentation map and the path signature feature information including determining connection feature data for a first stroke of a set of strokes of the digital ink stroke data by
identifying a first set of points of the first stroke;
identifying a second set of points of a second stroke that is after the first stroke in chronological writing order;
identifying a third set of points of a third stroke that is before the first stroke in chronological writing order;
determining a first set of vectors connecting respective points of the first set of points and the second set of points; and
determining a second set of vectors connecting respective points of the first set of points and the third set of points; and
providing the stroke feature data to the pixel-to-stroke conversion model; and
processing the digital ink stroke data based on the stroke-level semantic information.

10. A method implemented in a data processing system for performing a semantic analysis of digital ink stroke data, the method comprising:
obtaining the digital ink stroke data representing handwritten text, drawings, or both;
analyzing the digital ink stroke data to extract path signature feature information from the digital ink stroke data;
analyzing the path signature feature information using a convolutional neural network (CNN) trained to perform a pixel-level semantic analysis of the digital ink stroke data and to output a pixel segmentation map with semantic prediction information for each pixel of digital ink stroke data;
analyzing the pixel segmentation map to generate stroke-level semantic information using a pixel-to-stroke conversion model, the pixel-to-stroke conversion model being trained to recreate ink strokes in the digital ink stroke data from the pixel segmentation map and to generate the stroke-level semantic information from the recreated ink strokes; and
processing the digital ink stroke data based on the stroke-level semantic information.

11. The method of claim 10, wherein analyzing the digital ink stroke data to extract the path signature feature information from the digital ink stroke data further comprises:
determining geometric information for each respective stroke of the digital ink stroke data, the geometric information including geometrical locations of stroke points of each respective stroke, geometrical translation of stroke points for each respective stroke, and curvature information for each respective stroke.

12. The method of claim 10, wherein the CNN is a U-Net, and wherein the pixel-to-stroke conversion model comprises a Gradient Boosting Tree.

13. The method of claim 10, wherein the pixel segmentation map comprises, for each pixel, a prediction of whether the pixel is associated with a writing stroke.

14. The method of claim 13, wherein analyzing the pixel segmentation map to generate the stroke-level semantic information further comprises:
determining stroke feature data from the pixel segmentation map and the path signature feature information; and
providing the stroke feature data to the pixel-to-stroke conversion model.

15. The method of claim 14, wherein determining the stroke feature data further comprises:
determining geometrical feature information for a stroke of the digital ink stroke data by sampling a set of coordinates of the stroke and determining geometric relationships between the set of coordinates.

16. The method of claim 14, wherein determining the stroke feature data further comprises:
determining trajectory feature information for each stroke of a set of strokes of the digital ink stroke data by sampling a set of points from the pixel segmentation map to obtain the prediction information for each pixel of digital ink stroke data.

17. A method implemented in a data processing system for performing a semantic analysis of digital ink stroke data, the method comprising:
obtaining the digital ink stroke data representing handwritten text, drawings, or both;
analyzing the digital ink stroke data to extract path signature feature information from the digital ink stroke data;
analyzing the path signature feature information using a convolutional neural network (CNN) trained to perform a pixel-level semantic analysis of the digital ink stroke data and to output a pixel segmentation map with semantic prediction information for each pixel of digital ink stroke data;
analyzing the pixel segmentation map to generate stroke-level semantic information using a pixel-to-stroke conversion model wherein the pixel segmentation map comprises, for each pixel, a prediction of whether the pixel is associated with a writing stroke by
determining stroke feature data from the pixel segmentation map and the path signature feature information, wherein determining the stroke feature data includes determining connection feature data for a first stroke of a set of strokes of the digital ink stroke data by:
identifying a first set of points of the first stroke;
identifying a second set of points of a second stroke that is after the first stroke in chronological writing order;
identifying a third set of points of a third stroke that is before the first stroke in chronological writing order;
determining a first set of vectors connecting respective points of the first set of points and the second set of points; and
determining a second set of vectors connecting respective points of the first set of points and the third set of points; and
providing the stroke feature data to the pixel-to-stroke conversion model; and
processing the digital ink stroke data based on the stroke-level semantic information.

18. A machine-readable medium on which are stored instructions that, when executed, cause a processor of a programmable device to perform functions of:
obtaining digital ink stroke data representing handwritten text, drawings, or both;
analyzing the digital ink stroke data to extract path signature feature information from the digital ink stroke data;
analyzing the path signature feature information using a convolutional neural network (CNN) trained to perform a pixel-level semantic analysis of the digital ink stroke data and to output a pixel segmentation map with semantic prediction information for each pixel of digital ink stroke data;
analyzing the pixel segmentation map to generate stroke-level semantic information using a pixel-to-stroke conversion model, the pixel-to-stroke conversion model being trained to recreate ink strokes in the digital ink stroke data from the pixel segmentation map and to generate the stroke-level semantic information from the recreated ink strokes; and
processing the digital ink stroke data based on the stroke-level semantic information.

19. The machine-readable medium of claim 18, wherein to analyze the digital ink stroke data to extract the path signature feature information from the digital ink stroke data, the machine-readable medium further comprises instructions configured to cause the processor to perform operations of:
determining geometric information for each respective stroke of the digital ink stroke data, the geometric information including geometrical locations of stroke points of each respective stroke, geometrical translation of stroke points for each respective stroke, and curvature information for each respective stroke.

20. The machine-readable medium of claim 18, wherein analyzing the pixel segmentation map to generate the stroke-level semantic information, the machine-readable medium further comprises instructions configured to cause the processor to perform operations of:
determining stroke feature data from the pixel segmentation map and the path signature feature information; and
providing the stroke feature data to the pixel-to-stroke conversion model.

* * * * *